(12) United States Patent
Tamura

(10) Patent No.: US 8,143,844 B2
(45) Date of Patent: Mar. 27, 2012

(54) CHARGING DEVICE

(75) Inventor: Hikaru Tamura, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1109 days.

(21) Appl. No.: 12/007,622

(22) Filed: Jan. 14, 2008

(65) Prior Publication Data

US 2008/0174266 A1 Jul. 24, 2008

(30) Foreign Application Priority Data

Jan. 19, 2007 (JP) ................. 2007-010014

(51) Int. Cl.
  *H02J 7/00* (2006.01)
  *G08B 13/14* (2006.01)
  *H04B 7/185* (2006.01)
  *H04M 1/00* (2006.01)

(52) U.S. Cl. ........ 320/108; 320/107; 320/109; 320/139; 340/572.7; 455/13.3; 455/19; 455/25; 455/82; 455/550.1

(58) Field of Classification Search .................. 320/108
  See application file for complete search history.

(56) References Cited

U.S. PATENT DOCUMENTS

| | | | |
|---|---|---|---|
| 6,608,464 B1 * | 8/2003 | Lew et al. ...................... 320/107 |
| 6,924,164 B2 * | 8/2005 | Jenson ............................. 438/48 |
| 2002/0167500 A1 * | 11/2002 | Gelbman ....................... 345/204 |
| 2005/0194926 A1 * | 9/2005 | Di Stefano .................... 320/108 |
| 2007/0229228 A1 | 10/2007 | Yamazaki et al. |
| 2007/0229279 A1 | 10/2007 | Yamazaki et al. |
| 2007/0229281 A1 | 10/2007 | Shionoiri et al. |
| 2007/0278998 A1 | 12/2007 | Koyama |
| 2007/0285246 A1 * | 12/2007 | Koyama ..................... 340/572.1 |
| 2008/0024091 A1 | 1/2008 | Yamazaki et al. |
| 2008/0055047 A1 | 3/2008 | Osada et al. |
| 2008/0055279 A1 | 3/2008 | Osada et al. |
| 2008/0058029 A1 | 3/2008 | Sato et al. |
| 2008/0060422 A1 | 3/2008 | Hosoya |
| 2008/0079396 A1 | 4/2008 | Yamazaki et al. |
| 2008/0079565 A1 | 4/2008 | Koyama |
| 2008/0090604 A1 * | 4/2008 | Dover ......................... 455/550.1 |
| 2008/0122297 A1 | 5/2008 | Arai |
| 2008/0122401 A1 | 5/2008 | Sato et al. |
| 2008/0136604 A1 | 6/2008 | Kozuma et al. |
| 2008/0149624 A1 * | 6/2008 | Tamura .......................... 219/685 |
| 2008/0151660 A1 | 6/2008 | Inoue et al. |
| 2008/0157606 A1 | 7/2008 | Fukutome |

(Continued)

FOREIGN PATENT DOCUMENTS

JP  07-022172  1/1995

(Continued)

*Primary Examiner* — Yalkew Fantu
(74) *Attorney, Agent, or Firm* — Eric J. Robinson; Robinson Intellectual Property Law Office, P.C.

(57) ABSTRACT

The charging circuit includes an antenna circuit receiving radio waves, a rectifier circuit rectifying AC voltage generated in the antenna circuit to generate DC voltage, and a power supply circuit adjusting the magnitude of the DC voltage and charging a rechargeable battery using the adjusted DC voltage. The charging device may further include a charge control circuit controlling the power supply circuit so as to prevent overcharge of the rechargeable battery. The rechargeable battery may be charged by application of DC voltage to a pair of terminals, or it may be charged wirelessly in such a manner that an oscillation circuit and an output antenna circuit are additionally provided.

16 Claims, 22 Drawing Sheets

U.S. PATENT DOCUMENTS

| | | |
|---|---|---|
| 2008/0158217 A1 | 7/2008 | Hata et al. |
| 2008/0210762 A1 | 9/2008 | Osada et al. |
| 2008/0211800 A1 | 9/2008 | Arasawa et al. |
| 2008/0214132 A1 | 9/2008 | Kurokawa |
| 2008/0252254 A1 | 10/2008 | Osada |

FOREIGN PATENT DOCUMENTS

| | | |
|---|---|---|
| JP | 10-127981 | 5/1998 |
| JP | 10-178293 | 6/1998 |
| JP | 2003-299255 | 10/2003 |
| JP | 2006-166522 | 6/2006 |

* cited by examiner

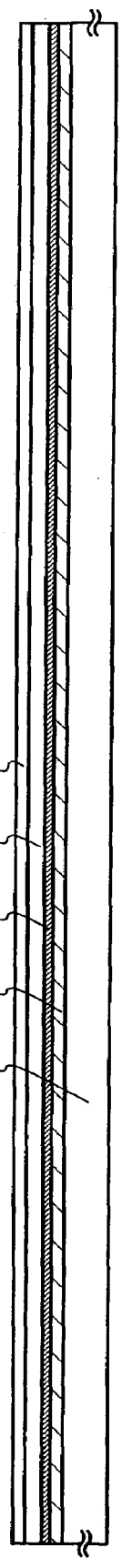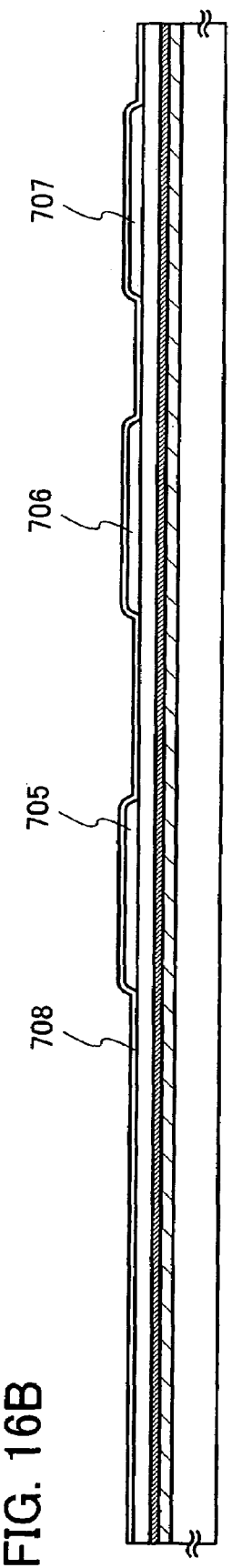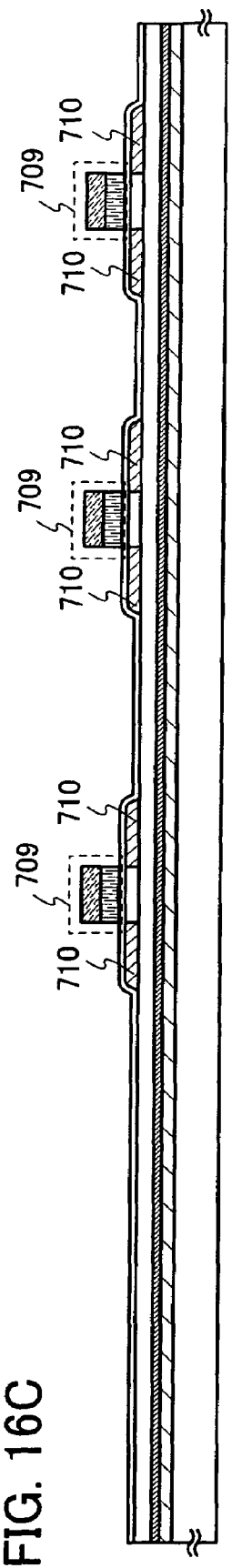

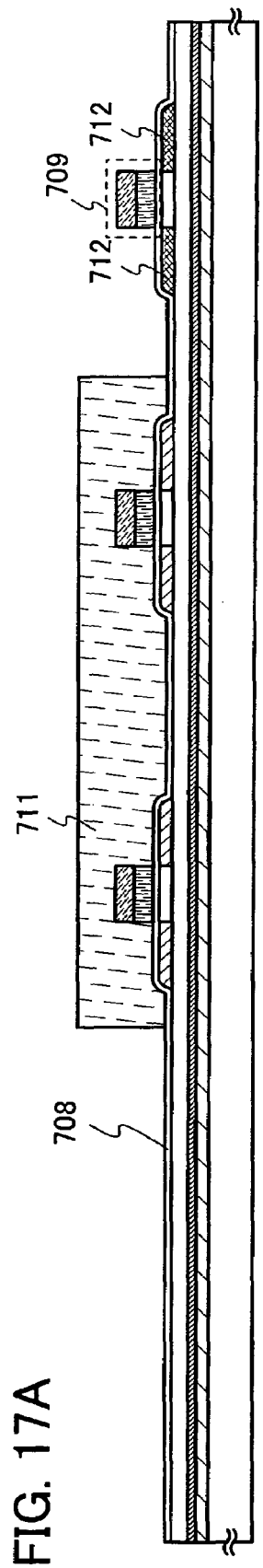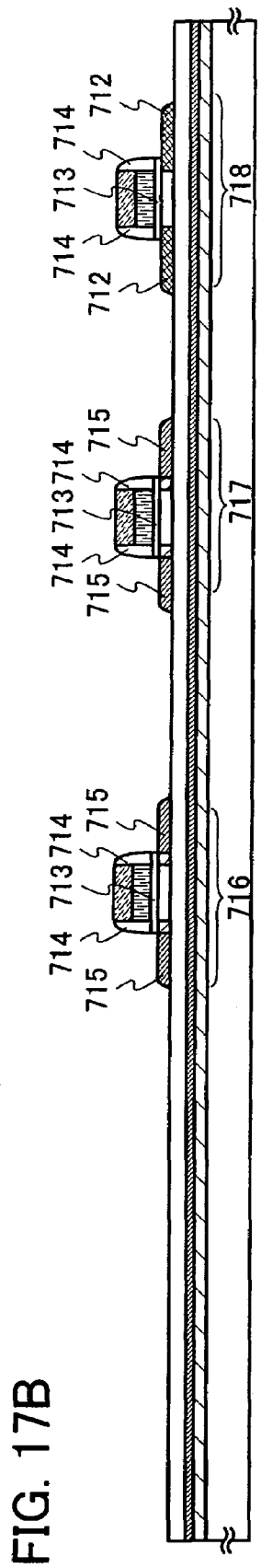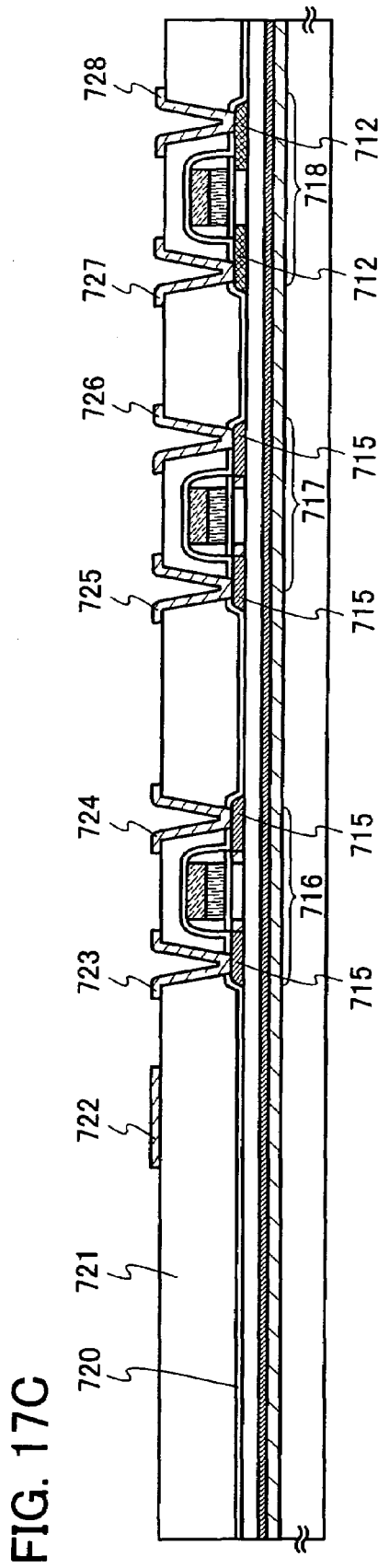

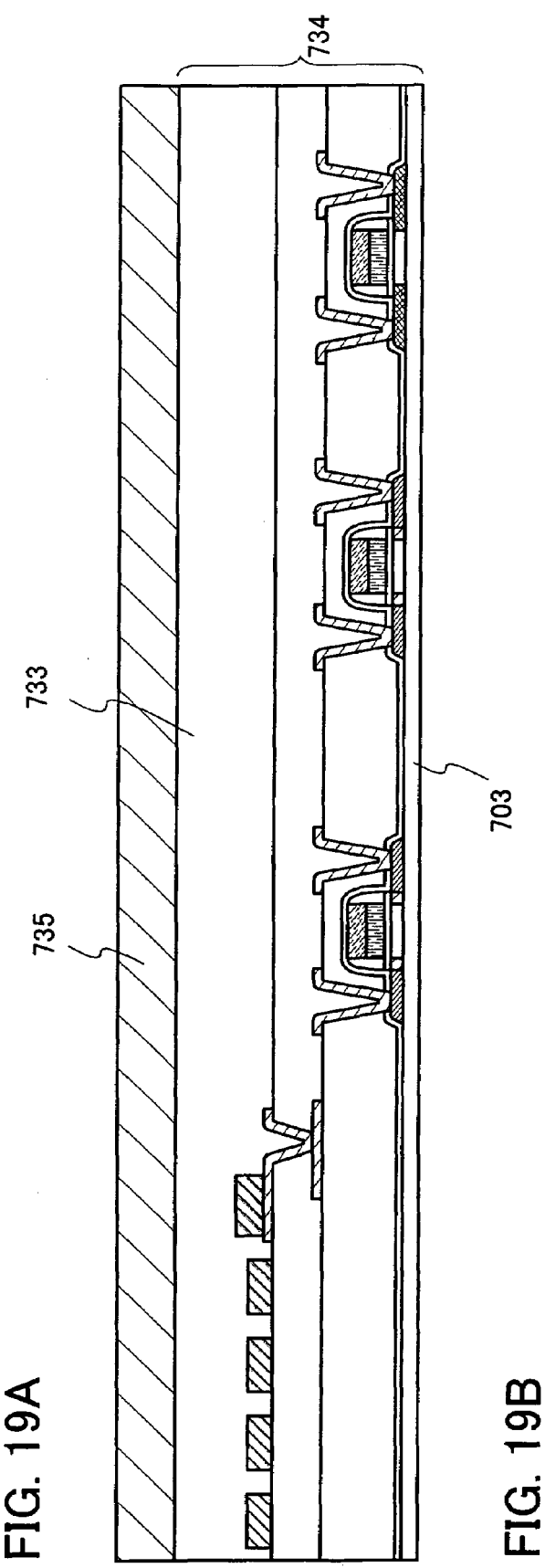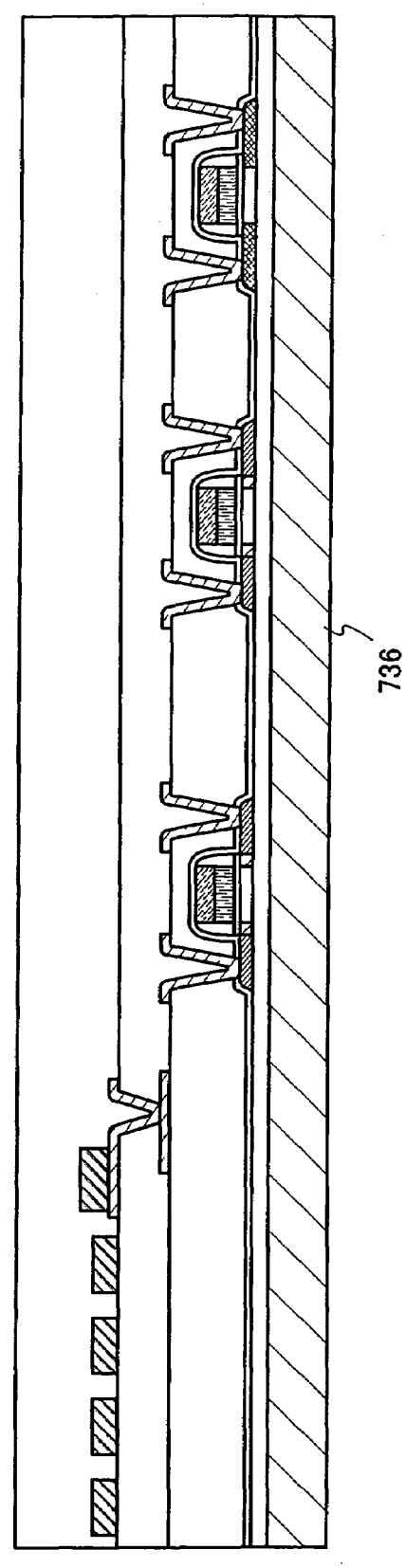

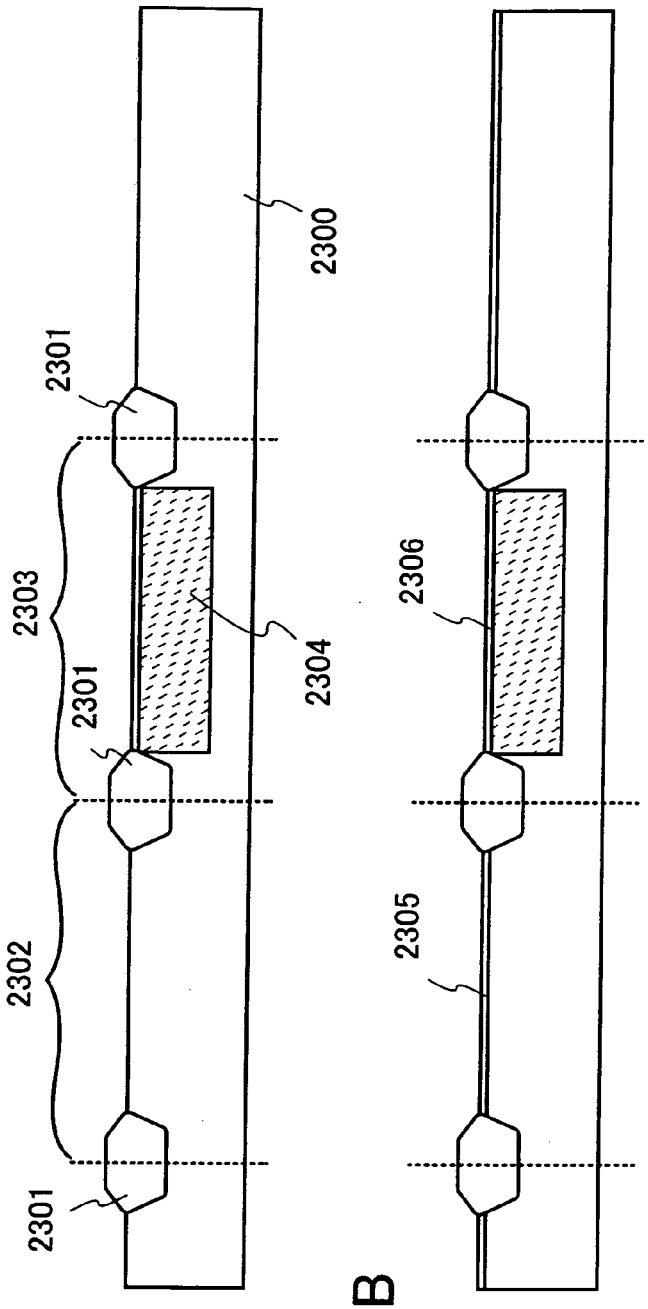
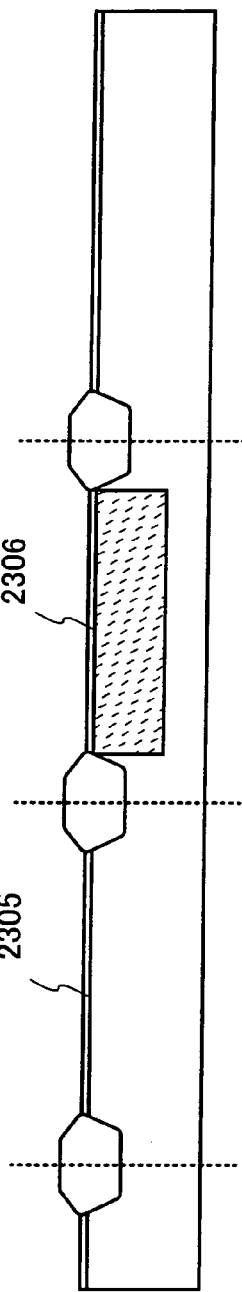
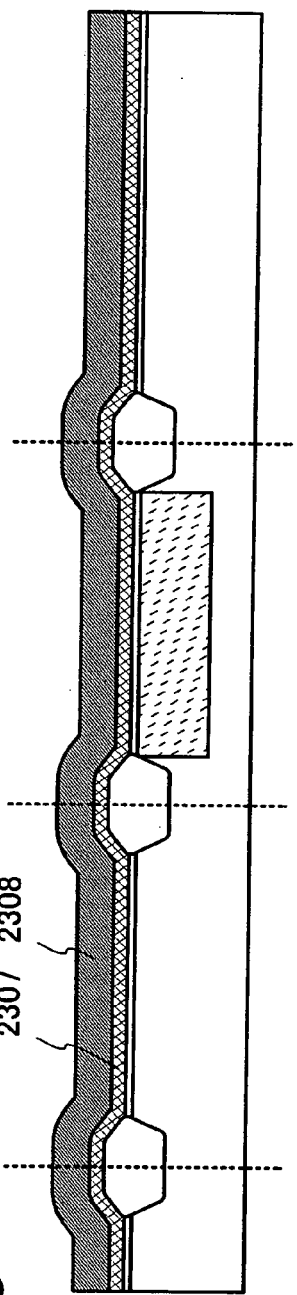
FIG. 20A
FIG. 20B
FIG. 20C

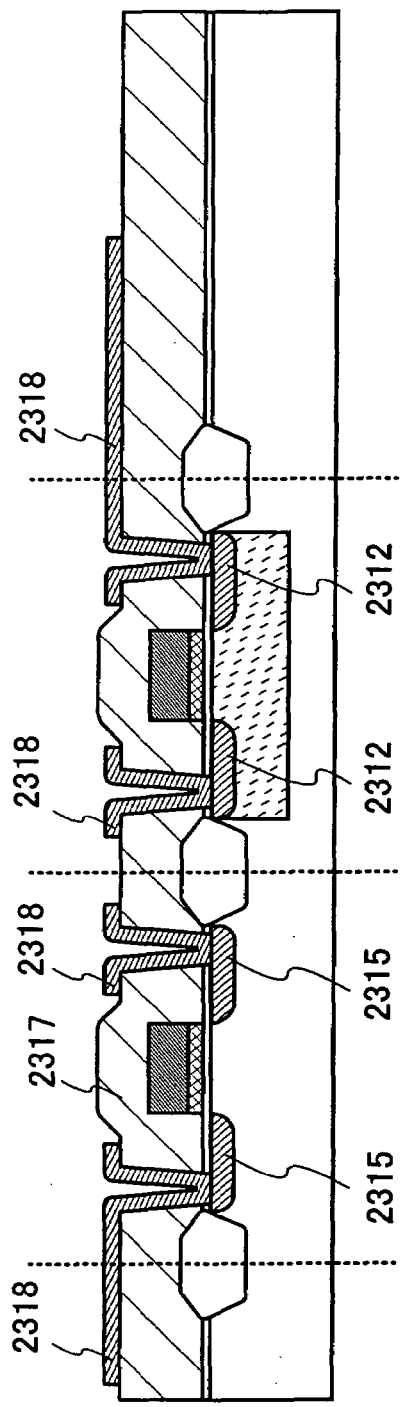
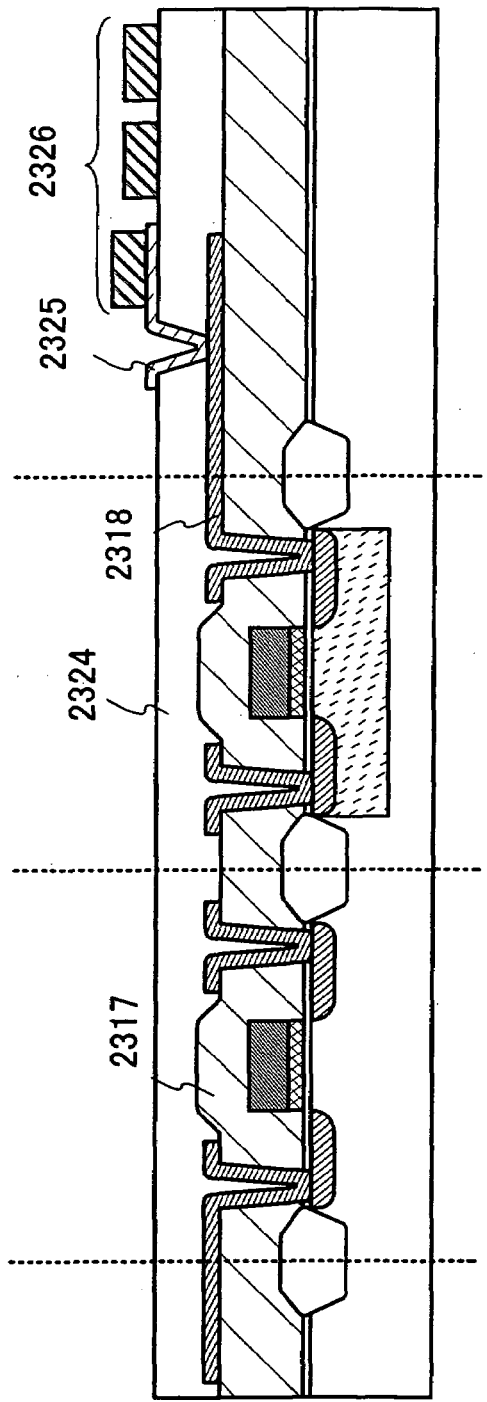
FIG. 22A
FIG. 22B

CHARGING DEVICE

BACKGROUND OF THE INVENTION

1. Field of the Invention

The present invention relates to a charging device which receives supply of electric power wirelessly.

2. Description of the Related Art

There are various home appliances which use electric power as an energy source, and they penetrate deeply into our lives as essentials. These home appliances include devices which mechanically operate by electric energy, such as motors, high-frequency devices which generate high frequency waves using electric energy, and the like. Thus, when home appliances are used, an electromagnetic field is generated around the home appliances.

In particular, a high-frequency heating apparatus using a high-frequency device, such as a microwave, has a feature of being capable of heating an object to be processed, such as food, by dielectric heating with electromagnetic waves. However, there has been a problem in that part of electromagnetic waves has not been absorbed by an object to be processed and have easily leaked outside a high-frequency heating apparatus. In Patent Document 1 (Japanese Published Patent Application No. H7-022172), a technique is described in which radio waves generated in heating by a dielectric heating apparatus are prevented from leaking by provision of a sealant for blocking radio waves and a sealant for absorbing radio waves.

In addition, there are many home appliances which generate an electromagnetic field around the home appliances when used, other than a high-frequency heating apparatus. In Patent Document 2 (Japanese Published Patent Application No. H10-127981), a technique is described in which electromagnetic waves leaking from an electric washing machine are blocked with the use of a box for blocking electromagnetic waves. In addition, in Patent Document 3 (Japanese Published Patent Application No. H10-178293), an electromagnetic shield which blocks electromagnetic waves leaking from a computer is described.

SUMMARY OF THE INVENTION

However, in fact, it is difficult to totally eliminate electromagnetic waves leaking from home appliances even if a measure to block the electromagnetic waves is taken as in Patent Documents 1 to 3. Leaking of electromagnetic waves means that energy for electric products cannot be effectively utilized. Thus, there has been a problem in that electric power has been wasted by electric products. In addition, there has been a problem in that electromagnetic waves are easily generated also around a large electric generator for stable supply of electricity or equipment for power transmission, and electromagnetic waves are only discharged, which is not preferable in terms of energy saving.

In view of the foregoing problem, it is an object of the present invention to provide a charging device which can effectively utilizes electromagnetic waves which are discharged uselessly.

In the present invention, surplus radio waves which would normally be left without being used is received, so that electric energy is generated and the electric energy is supplied to a rechargeable battery (a secondary battery) included in a electronic appliance (hereinafter, referred to as an object to be charged). Specifically, a charging device of the present invention includes an antenna circuit which receives radio waves, a rectifier circuit which rectifies AC voltage generated in the antenna circuit to generate DC voltage, and a power supply circuit which adjusts the magnitude of the DC voltage and charges a rechargeable battery using the adjusted DC voltage. The charging device may further include a charge control circuit which controls the power supply circuit so that overcharge of the rechargeable battery is prevented. The rechargeable battery may be charged by application of adjusted DC voltage to a pair of terminals, or may be charged wirelessly in such a manner that an oscillation circuit and an output antenna circuit are additionally provided.

Moreover, the charging device of the present invention includes a first protective material which covers the rectifier circuit, the power supply circuit, the charge control circuit, and the object to be charged. The charging device further includes a second protective material which covers the antenna circuit. The first protective material is provided in order to prevent radio waves from entering the rectifier circuit, the power supply circuit, the charge control circuit, and the object to be charged. The second protective material is provided in order to physically protect the antenna circuit. The second protective material may be provided so as to cover not only the antenna circuit but also the rectifier circuit, the power supply circuit, the charge control circuit, and the object to be charged.

Note that in a case where the oscillation circuit and the output antenna circuit are additionally provided for the charging device and the rechargeable battery is charged wirelessly, the oscillation circuit, as well as the above-described circuits, are covered with the first protective material or both the first protective material and the second protective material. In addition, the output antenna circuit is covered with the first protective material and the second protective material.

In the present invention, surplus radio waves which would normally be left without being used can be converted into electric energy to be reused, which leads to energy saving. In addition, the use of the first protective material makes it possible to prevent deterioration or destruction and malfunction of the rectifier circuit, the power supply circuit, the charge control circuit, and the oscillation circuit which are included in the charging device, and the object to be charged by dielectric heating due to the entry of radio waves, and to supply surplus radio waves as electric energy to the rechargeable battery that is the object to be charged.

In addition, in a case where charging is performed wirelessly with the use of the output antenna circuit, frequencies of surplus radio waves can be converted in the charging device. Therefore, the frequencies of the radio waves are converted in the charging device so that the object to be charged can receive the surplus radio waves most efficiently even in a case where the frequencies of surplus radio waves depart from a range capable of being received by the object to be charged, and it is difficult for the object to be charged to directly receive the surplus radio waves; accordingly, the surplus radio waves can be reused as electric energy.

BRIEF DESCRIPTION OF THE DRAWINGS

In the accompanying drawings:

FIGS. 16A to 16C are views showing a manufacturing method of a charging device of the present invention;

FIGS. 17 A to 17C are views showing a manufacturing method of a charging device of the present invention;

FIGS. 19A and 19B are views showing a manufacturing method of a charging device of the present invention;

FIGS. 20A to 20C are views showing a manufacturing method of a charging device of the present invention;

FIGS. 22A and 22B are views showing a manufacturing method of a charging device of the present invention.

DETAILED DESCRIPTION OF THE INVENTION

Embodiment Mode

Embodiment Modes of the present invention will be hereinafter described with reference to the accompanying drawings. However, the present invention can be carried out in many different modes and it is easily understood by those skilled in the art that modes and details of the present invention can be modified in various ways without departing from the purpose and scope of the present invention. Therefore, the present invention should not be interpreted as being limited to the following description of Embodiment Modes.

Embodiment Mode 1

Figure 1:
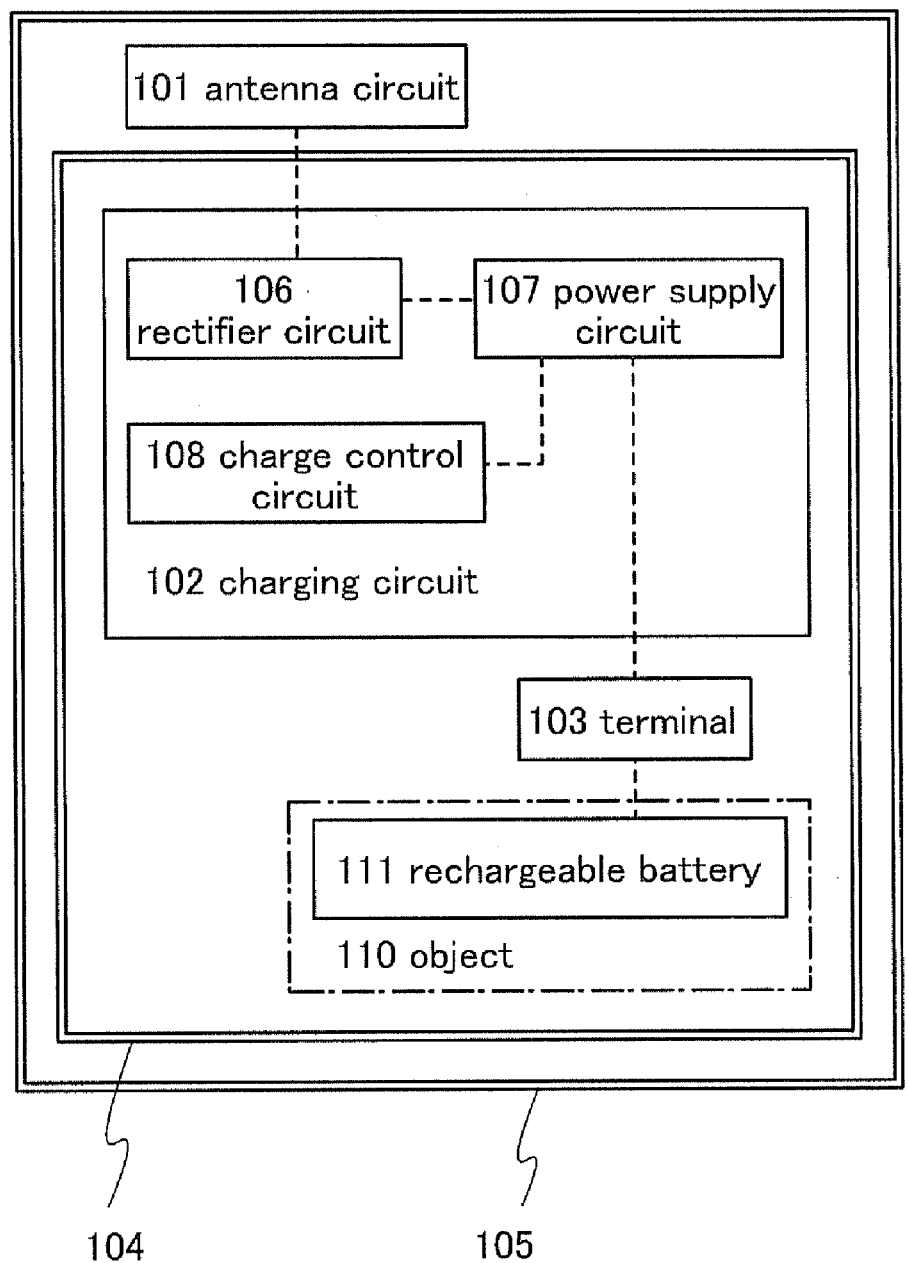
FIG. 1 is a block diagram showing a structure of a charging device of the present invention.

A structure of a charging device of the present invention will be described. FIG. 1 is a block diagram showing a structure of the charging device of the present invention as an example. The charging device shown in FIG. 1 includes an antenna circuit 101, a charging circuit 102, a terminal 103, a first protective material 104, and a second protective material 105. The charging circuit 102 includes a rectifier circuit 106, a power supply circuit 107, and a charge control circuit 108.

In addition, FIG. 1 shows an object to be charged 110 which receives supply of electric energy from the charging device of the present invention. The object to be charged 110 is stored in a storage portion with connected to the terminal 103. The terminal 103 may be provided in the storage portion or outside the storage portion. The object to be charged 110 includes a rechargeable battery 111, and the object to be charged 110 can be charged with the use of electric energy from the charging device.

The first protective material 104 is provided so as to cover the charging circuit 102, the terminal 103, and the object to be charged 110 stored in the storage portion. The purpose of the first protective material 104 is to protect the charging circuit 102 included in the charging device and the object to be charged 110 from external radio waves. Therefore, in consideration of frequencies of external radio waves, a material which can prevent transmission of radio waves, such as a radio wave absorption material, is used for the first protective material 104. For example, a material formed in such a manner that a magnetic loss material is mixed into a base material can be used as the radio wave absorption material. In this case, a synthetic rubber or urethane may be used for the base material, and a carbon material, a ferrite material, or a carbonyl iron material may be used as the magnetic loss material. If external radio waves are used at a frequency of 2.45 GHz, a material in which a ferrite material is mixed into a synthetic rubber, urethane, or the like can be used.

The second protective material 105 physically protects the antenna circuit 101. A synthetic resin such as polyethylene, polypropylene, or poly vinyl chloride, ceramic, or the like is used for the second protective material 105.

Note that materials for the first protective material 104 and the second protective material 105 are not limited to the above-described materials. The material described as the material of the first protective material 104 may be used for the second protective material 105. The material described as the material of the second protective material 105 may be used for the first protective material 104. Alternatively, the same material can be used for the first protective material 104 and the second protective material 105. Note that, it is necessary that the first protective material 104 transmit radio waves less easily than the second protective material 105. Thus, in a case where a material with high attenuation of radio waves is used for both the first protective material 104 and the second protective material 105, it is necessary that the thicknesses or the shapes of the protective materials be varied. The thickness of the second protective material 105 may be made thinner than that of the first protective material 104. For example, in a case of using a ferrite material and a synthetic rubber for the first protective material 104 and the second protective material 105, the thickness of the first protective material 104 may be set to about 6 mm, and the thickness of the second protective material 105 may be set to about 1 to 2 mm. The first protective material 104 and the second protective material 105 may be formed of an appropriate material in accordance with the purpose.

Next, the operation of the charging device of the present invention is described with reference to FIG. 1.

When AC voltage is generated by reception of radio waves by the antenna circuit 101, the AC voltage is outputted to the rectifier circuit 106. The antenna circuit 101 includes an antenna and a resonance capacitor which is connected to the antenna in parallel. Note that the antenna is acceptable as long as it can receive radio waves and generate electric energy. For example, a dipole antenna, a patch antenna, a loop antenna, a Yagi antenna, or the like can be used as the antenna. A resonance capacitor is not necessarily provided for the antenna circuit 101 depending on a type of an antenna. Any of an electromagnetic coupling system, an electromagnetic induction system, and a radio wave system may be used as a system in which the antenna circuit 101 receives radio waves wirelessly. Electric power received by the charging device wirelessly can be supplied, with the use of radio waves of various frequencies such as 125 kHz, 13.56 MHz, 950 MHz, and 2.45 GHz.

The rectifier circuit 106 rectifies the supplied AC voltage, generates DC voltage, and outputs the DC voltage to the power supply circuit 107. The power supply circuit 107 adjusts the magnitude of the DC voltage inputted from the rectifier circuit 106 so that the DC voltage is enough to charge the rechargeable battery 111. Then, the power supply circuit 107 generates current using the adjusted DC voltage and supplies the current to the rechargeable battery 111 through the terminal 103. The charge control circuit 108 can control the power supply circuit 107 so as to prevent overcharge of the rechargeable battery 111.

The power supply circuit 107 can be formed using a regulator and a switching circuit. If a diode is used for the switching circuit, overcharge of the rechargeable battery 111 can be prevented without using the charge control circuit 108. Alternatively, a constant voltage circuit and a constant current circuit may be used for the power supply circuit 107.

Figure 2:
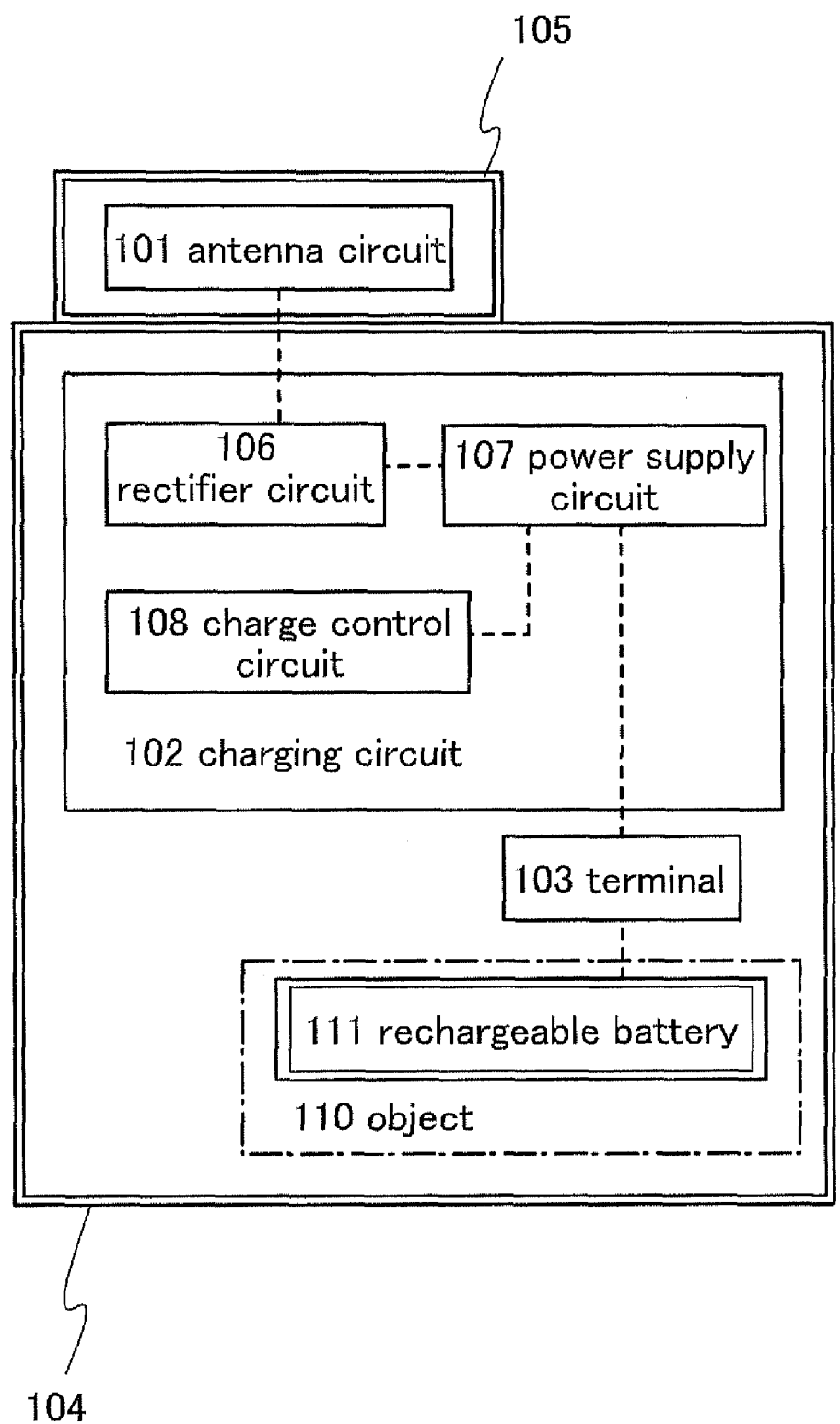
FIG. 2 is a block diagram showing a structure of a charging device of the present invention.

Note that, although not only the antenna circuit 101 but also the charging circuit 102 and the object to be charged 110 are covered with the second protective material 105 in FIG. 1, the present invention is not limited to this structure. For example, as shown in FIG. 2, a structure may be employed in which the antenna circuit 101 is covered only with the second protective material 105 and the charging circuit 102 and the object to be charged 110 stored in the storage portion are covered only with the first protective material 104.

In addition, although an example in which the object to be charged 110 is placed in the charging device to be charged is shown in FIG. 1, the present invention is not limited to this structure. The rechargeable battery 111 can be taken out of the object to be charged 110 and only the rechargeable battery 111 can be placed in the charging device to be charged.

The structure of the present invention makes it possible for the antenna circuit 101 to receive surplus radio waves which would normally be left without being used, to generate electric energy, and to charge the rechargeable battery 111 using the electric energy. Thus, energy can be reused, which leads to energy saving. In addition, the use of the first protective material 104 makes it possible to prevent deterioration or destruction and malfunction of the rectifier circuit 106, the power supply circuit 107, and the charge control circuit 108 which are included in the charging device, and the object to be charged 110 or the rechargeable battery 111 by dielectric heating due to the entry of radio waves, and to supply surplus radio waves as electric energy to the rechargeable battery 111 of the object to be charged 110.

Embodiment Mode 2

Figure 3:
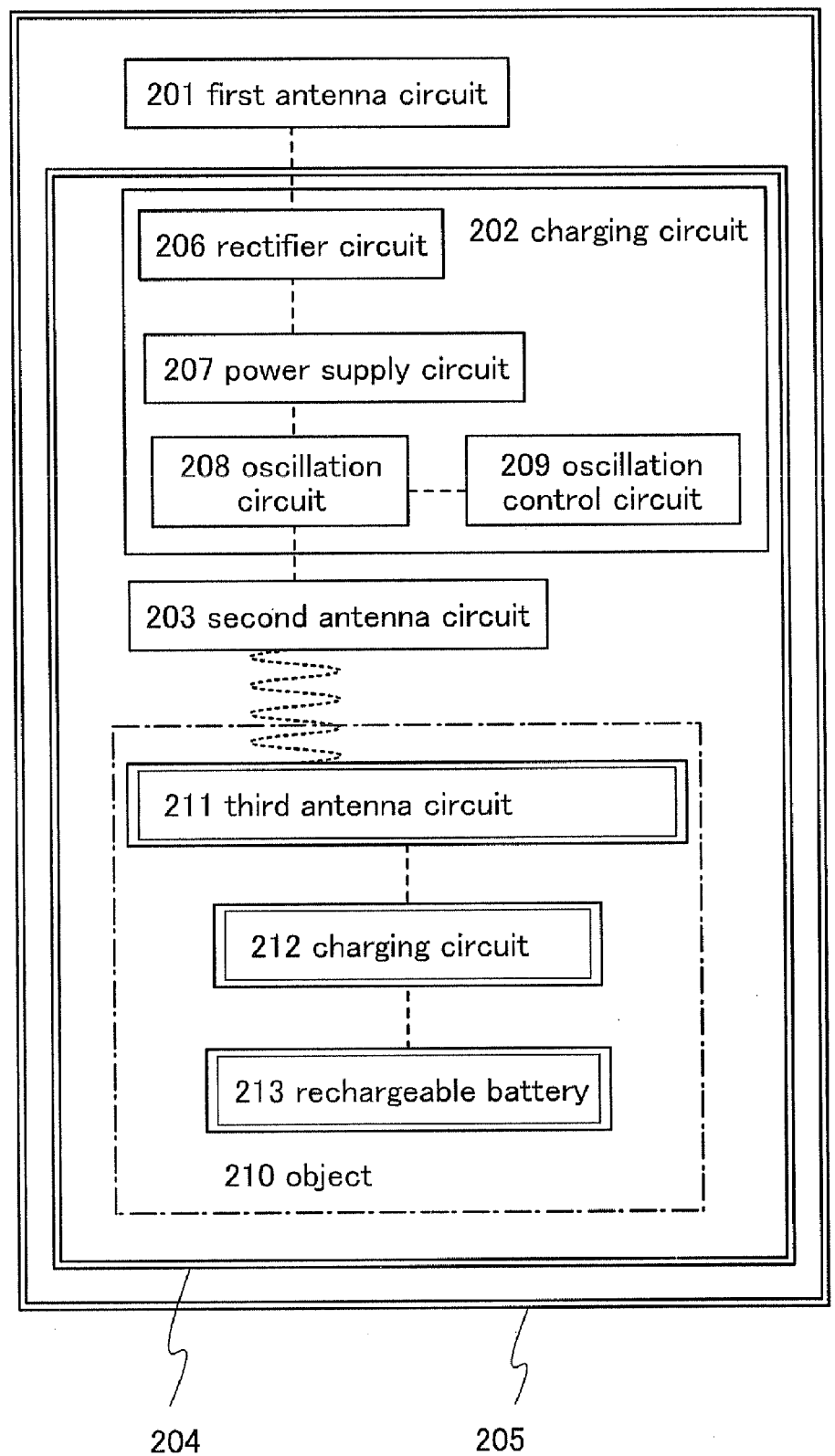
FIG. 3 is a block diagram showing a structure of a charging device of the present invention.

A structure of a charging device of the present invention will be described. FIG. 3 is a block diagram showing a structure of a charging device of the present invention as an example. The charging device shown in FIG. 3 includes a first antenna circuit 201, a charging circuit 202, a second antenna circuit 203, a first protective material 204, and a second protective material 205. The charging circuit 202 includes a rectifier circuit 206, a power supply circuit 207, an oscillation circuit 208, and an oscillation control circuit 209.

In addition, an object to be charged 210 that is an electronic appliance which receives supply of electric power from the charging device of the present invention is shown in FIG. 3. The object to be charged 210 includes a third antenna circuit 211, a charging circuit 212, and a rechargeable battery 213.

The object to be charged 210 can be charged wirelessly with the use of electric energy from the charging device. The object to be charged 210 is stored in a storage portion with placed at a position capable of receiving radio waves from the second antenna circuit 203. The second antenna circuit 203 may be provided in the storage portion or outside the storage portion.

In a similar manner to Embodiment Mode 1, the first protective material 204 is provided so as to cover the charging circuit 202, the second antenna circuit 203, and the object to be charged 210 stored in the storage portion. The purpose of the first protective material 204 is to protect the charging circuit 202 included in the charging device, the object to be charged 210 stored in the storage portion, and the second antenna circuit 203 from external radio waves. Therefore, in consideration of frequencies of external radio waves, a material which can prevent transmission of radio waves, such as a radio wave absorption material, is used for the first protective material 204. For example, a material formed in such a manner that a magnetic loss material is mixed into a base material can be used as the radio wave absorption material. In this case, a synthetic rubber or urethane may be used for the base material, and a carbon material, a ferrite material, or a carbonyl iron material may be used as the magnetic loss material. If external radio waves are used at a frequency of 2.45 GHz, a material in which a ferrite material is mixed into a synthetic rubber, urethane, or the like can be used.

The second protective material 205 physically protects the first antenna circuit 201. A synthetic resin such as polyethylene, polypropylene, or poly vinyl chloride, ceramic, or the like is used for the second protective material 205.

Note that materials for the first protective material 204 and the second protective material 205 are not limited to the above-described materials. The material described as the material of the first protective material 204 may be used for the second protective material 205. The material described as the material of the second protective material 205 may be used for the first protective material 204. Alternatively, the same material can be used for the first protective material 204 and the second protective material 205. Note that, it is necessary that the first protective material 204 transmit radio waves less easily than the second protective material 205. Thus, in a case where a material with high attenuation of radio waves is used for both the first protective material 204 and the second protective material 205, it is necessary that the thicknesses or the shapes of the protective materials be varied. The thickness of the second protective material 205 may be made thinner than that of the first protective material 204. For example, in a case of using a ferrite material and a synthetic rubber for the first protective material 204 and the second protective material 205, the thickness of the first protective material 204 may be set to about 6 mm, and the thickness of the second protective material 205 may be set to about 1 to 2 mm. The first protective material 204 and the second protective material 205 may be formed of an appropriate material in accordance with the purpose.

Next, the operation of the charging device of the present invention is described with reference to FIG. 3.

When AC voltage is generated by reception of radio waves by the first antenna circuit 201, the AC voltage is outputted to the rectifier circuit 206. The rectifier circuit 206 rectifies the supplied AC voltage, generates DC voltage, and outputs the DC voltage to the power supply circuit 207. The power supply circuit 207 adjusts the magnitude of the DC voltage inputted from the rectifier circuit 206 in such a degree that the DC voltage can be used for driving the oscillation circuit 208. Then, the oscillation circuit 208 generates AC voltage by being driven with the use of the adjusted DC voltage and outputs the AC voltage to the second antenna circuit 203. The oscillation control circuit 209 is a circuit which can stop driving of the oscillation circuit 208 in a case where charging of the rechargeable battery 213 is not needed. However, in a case where the oscillation circuit 208 itself can have the function of stopping its driving, the oscillation control circuit 209 does not have to be additionally provided.

The second antenna circuit 203 generates radio waves when the AC voltage is inputted to the second antenna circuit 203. A frequency of radio waves generated in the second antenna circuit 203 is desirably within a range in which the third antenna circuit 211 included in the object to be charged 210 can sufficiently receive. The frequency of the radio waves generated in the second antenna circuit 203 is desirably set so as to be a frequency which is enough to prevent deterioration or destruction and malfunction of the charging circuit 202 which is included in the charging device, and the charging circuit 212 and the rechargeable battery 213 which are included in the object to be charged 210 by dielectric heating due to the entry of radio waves, that is, a frequency lower than that of the radio waves received by the first antenna circuit 201.

Specifically, the frequency of the radio waves generated in the second antenna circuit 203 can be adjusted by change of the magnitude of the DC voltage inputted to the oscillation circuit 208. In addition, a type of a semiconductor element used for the oscillation circuit 208, the number of semiconductor elements, and connection of the semiconductor elements are changed for a different structure, so that the frequency of the radio waves generated in the second circuit 203 can be changed.

The third antenna circuit 211 included in the object to be charged 210 receives the radio waves from the second antenna circuit 203 and generates AC current. Then, the charging circuit 212 included in the object to be charged 210 charges the rechargeable battery 213 using the AC current. Specifically, AC voltage is rectified in the charging circuit 212 and DC voltage is generated, and then the magnitude of the DC voltage is adjusted to be enough to charge the rechargeable battery 213. Then, current is generated with the use of the adjusted DC voltage, and the current is supplied to the rechargeable battery 213.

Note that each of the first antenna circuit 201, the second antenna circuit 203, and the third antenna circuit 211 includes an antenna and a resonance capacitor which is connected to the antenna in parallel. Note that the antenna is acceptable as long as it can generate electric energy. For example, a dipole antenna, a patch antenna, a loop antenna, a Yagi antenna, or the like can be used as the antenna. A resonance capacitor is not necessarily provided for the first antenna circuit 201, the second antenna circuit 203, or the third antenna circuit 211, depending on a type of an antenna. Any of an electromagnetic coupling system, an electromagnetic induction system, and a radio wave system may be used as a system in which the first antenna circuit 201, the second antenna circuit 203, or the third antenna circuit 211 receives radio waves wirelessly. Electric power received by the charging device wirelessly can be supplied, with the use of radio waves of various frequencies such as 125 kHz, 13.56 MHz, 950 MHz, and 2.45 GHz.

Figure 4:
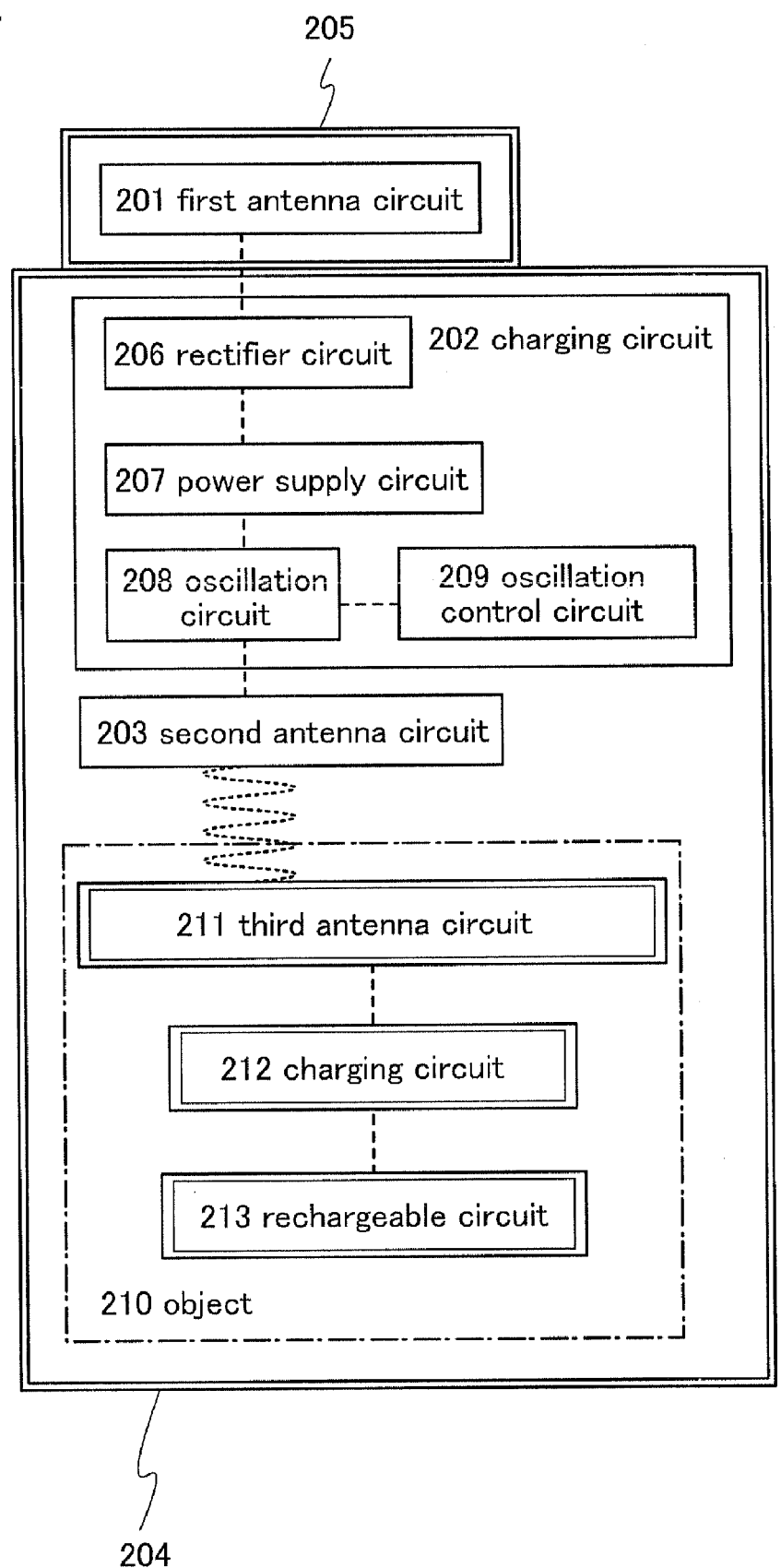
FIG. 4 is a block diagram showing a structure of a charging device of the present invention.

Note that, although not only the first antenna circuit 201 but also the charging circuit 202 and the object to be charged 210 are covered with the second protective material 205 in FIG. 3, the present invention is not limited to this structure. For example, as shown in FIG. 4, a structure may be employed in which the first antenna circuit 201 is covered only with the second protective material 205 and the charging circuit 202, the second antenna circuit 203, and the object to be charged 210 stored in the storage portion are covered only with the first protective material 204.

In addition, although an example in which the object to be charged 210 is placed in the charging device to be charged is shown in FIG. 3, the present invention is not limited to this structure. The third antenna circuit 211, the charging circuit 212, and the rechargeable battery 213 can be taken out of the object to be charged 210 and they can be placed in the charging device to be charged.

The structure of the present invention makes it possible for the antenna circuit 201 to receive surplus radio waves which would normally be left without being used, to generate electric energy, and to charge the rechargeable battery 213 using the electric energy. Thus, energy can be reused, which leads to energy saving. In addition, the use of the first protective material 204 makes it possible to prevent deterioration or destruction and malfunction of the rectifier circuit 206, the power supply circuit 207, the oscillation circuit 208, and the oscillation control circuit 209 which are included in the charging device, and the object to be charged 210 (or the third antenna circuit 211, the charging circuit 212, and the rechargeable battery 213) by dielectric heating due to the entry of radio waves, and to supply surplus radio waves as electric energy to the rechargeable battery 213 of the object to be charged 210.

In addition, in a case where the rechargeable battery 213 is charged wirelessly with the use of the output second antenna circuit 203, a frequency of surplus radio waves can be converted in the charging device. Therefore, the frequency of the radio wave is converted in the charging device so that the third antenna circuit 211 of the object to be charged 210 can receive the surplus radio waves most efficiently even in a case where the frequencies of the surplus radio waves depart from a range capable of being received by the object to be charged 210, and it is difficult for the third antenna circuit 211 of the object to be charged 210 to directly receive the surplus radio waves; accordingly, the surplus radio waves can be reused as electric energy.

Embodiment Mode 3

In this embodiment mode, a specific structure of the charging device of the present invention described in Embodiment Mode 1 or 2 will be described.

Figure 5A:
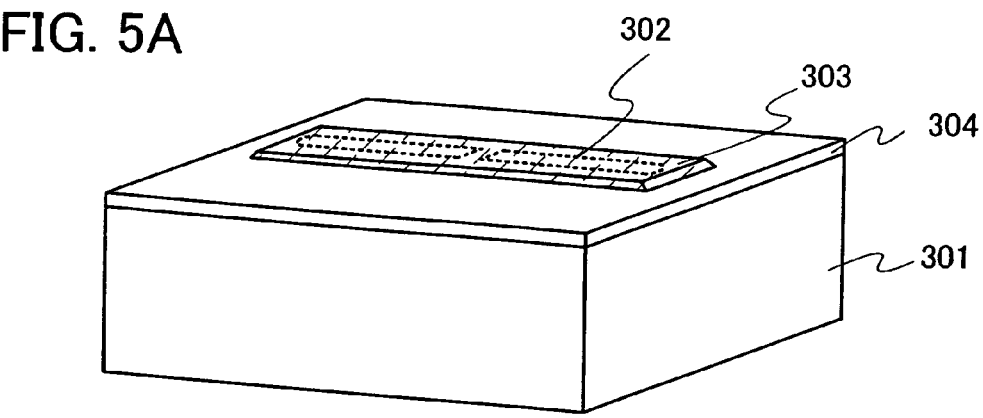
FIGS. 5A to 5C are perspective views each showing an outer appearance of a charging device of the present invention.
Figure 5B:
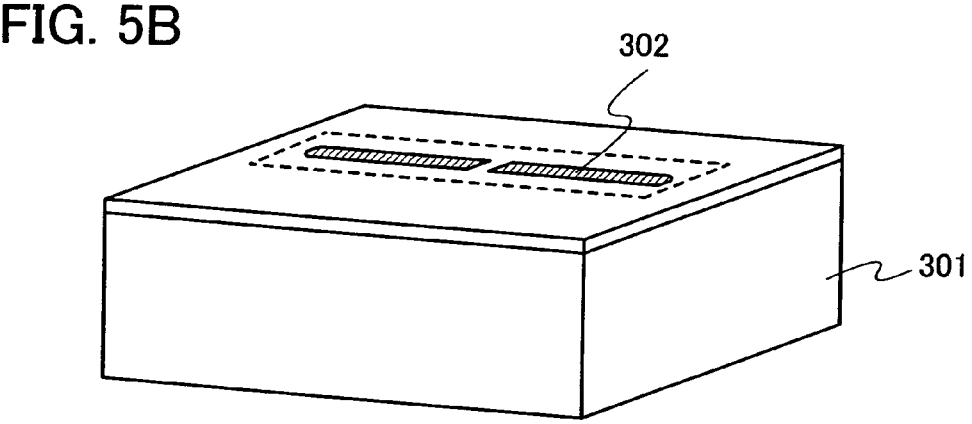
Figure 5C:
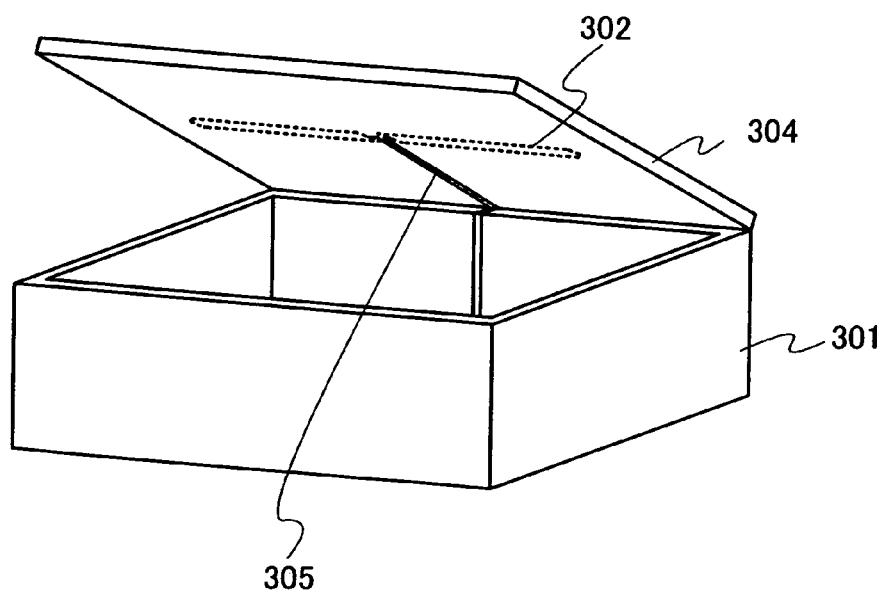

An outer appearance of the charging device of the present invention is shown as an example in FIGS. 5A to 5C. FIG. 5A is a perspective view of the charging device of the present invention. A housing 301 functions as a first protective material. The housing 301 includes a lid 304 which is openable and closable when an object to be charged is taken in and out of the housing 301. An antenna circuit or a first antenna circuit (hereinafter, in this embodiment, referred to as an antenna circuit) 302 is provided for the housing 301, and a second protective material 303 is provided so as to cover the antenna circuit 302.

FIG. 5B shows a state in which the second protective material 303 is removed from the charging device shown in FIG. 5A. Note that, although an example in which a dipole antenna is used for the antenna circuit 302 is shown in FIG. 5B, the present invention is not limited to this structure. As shown in FIG. 5B, the antenna circuit 302 is provided outside the housing 301 which functions as the first protective material and covered only with the second protective material 303, of the first protective material and the second protective material 303.

FIG. 5C shows a state of the charging device with the lid 304 included in the housing open. The antenna circuit 302 is electrically connected to a charging circuit provided inside the housing 301 through wirings 305.

Figure 6A:
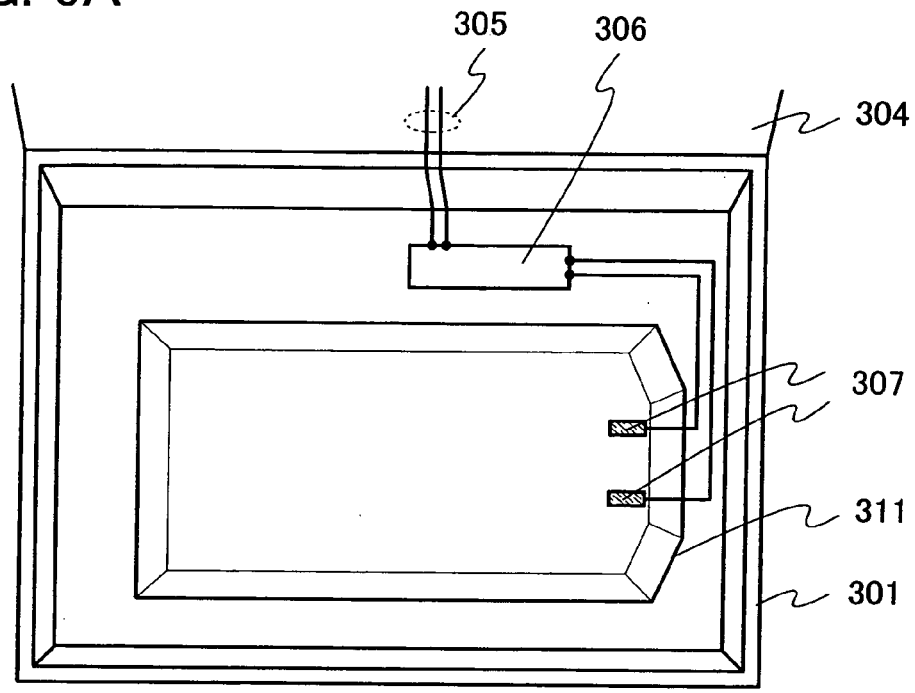
FIGS. 6A and 6B are top views each showing an internal structure of a charging device of the present invention.

Next, FIG. 6A shows a state in which a charging circuit 306 is placed inside the housing 301. Note that, in FIG. 6A, a case where the charging circuit 306 and an object to be charged are connected to each other through terminals 307 is given as an example. AC voltage is inputted to the charging circuit 306 from the antenna circuit 302 through the wirings 305. In addition, the charging circuit 306 and the terminals 307 are electrically connected to each other. The object to be charged is placed in a storage portion 311 in the housing 301 so as to be electrically connected to the charging circuit 306 through the terminals 307.

Figure 6B:
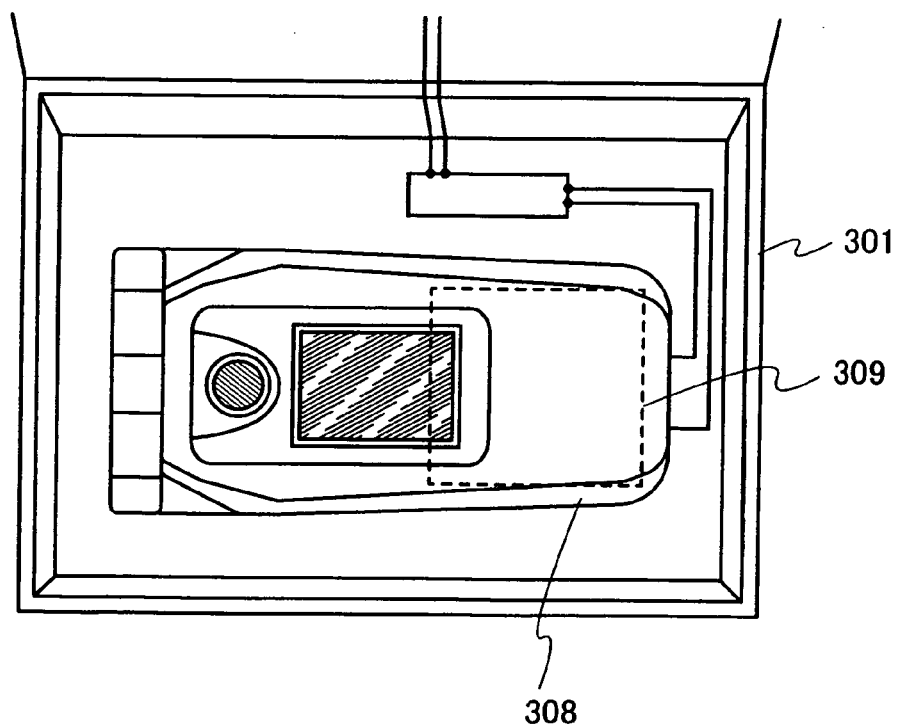

FIG. 6B shows a state in which a cellular phone 308 as an object to be charged is placed inside the housing 301. The cellular phone 308 has a size which is small enough to be stored inside the housing 301. The charging circuit 306 and the cellular phone 308 are electrically connected to each other through the terminals 307, and a rechargeable battery 309 included in the cellular phone 308 is charged by supply of current from the charging circuit 306.

Note that, although FIG. 6B shows an example in which the whole cellular phone 308 that is the object to be charged is stored inside the housing 301, the present invention is not limited to this structure. A structure may also be employed in which the rechargeable battery 309 is taken out of the cellular phone 308, only the rechargeable battery 309 is stored inside the housing 301 to be charged, and the rechargeable battery 309 is installed again in the cellular phone 308 after the charging is completed. In this case, the size of the housing 301 can be reduced.

Figure 7:
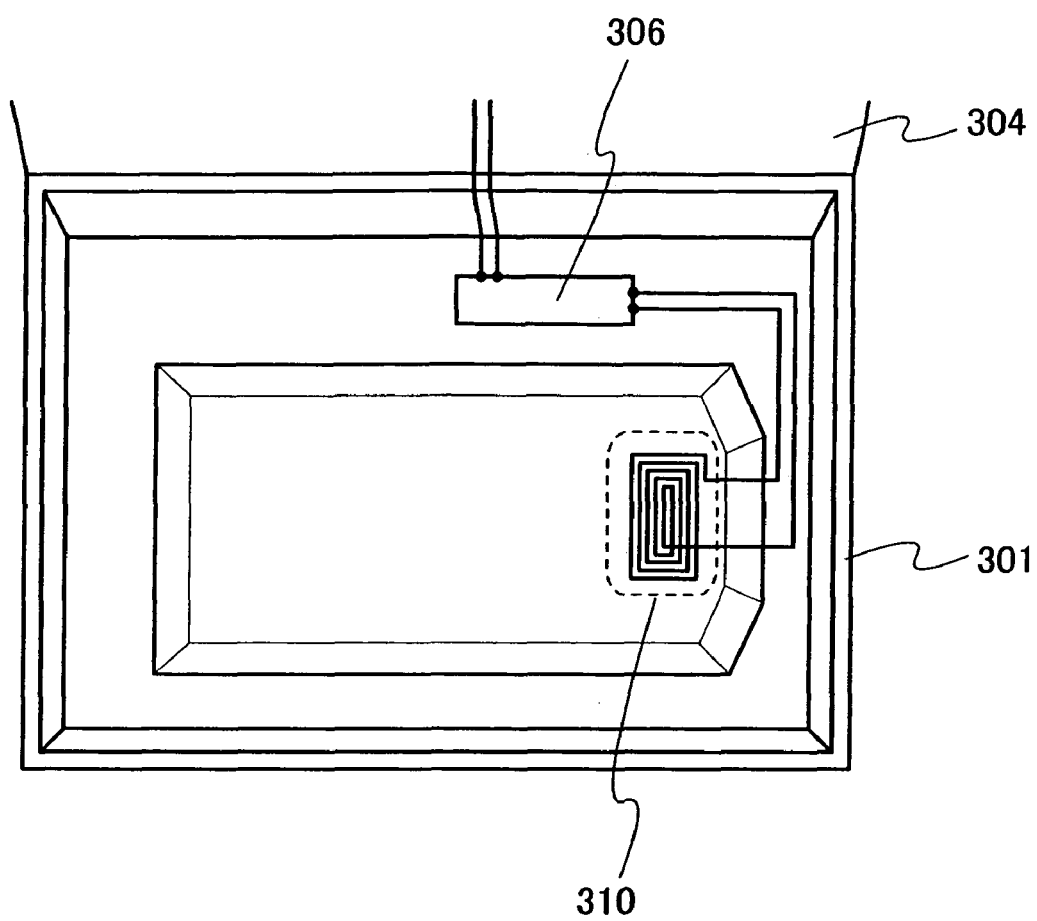
FIG. 7 is a top view showing an internal structure of a charging device of the present invention.

In addition, although FIG. 6A shows an example in which electric power is supplied to the object to be charged from the charging circuit 306 through the terminals 307 as shown in Embodiment Mode 1, this embodiment mode is not limited to this structure. As shown in Embodiment Mode 2, an output antenna circuit may be provided so that electric power is supplied to the object to be charged wirelessly. FIG. 7 shows state of the inside of the housing 301 in a case where a second antenna circuit 310 is provided being coupled to the charging circuit 306. Although FIG. 7 shows an example in which a coiled antenna is used as the second antenna circuit 310, the shape of the antenna is not limited to the coil shape.

Embodiment Mode 4

In this embodiment mode, a structure of a charging device of the present invention which can supply electric power to a plurality of objects to be charged will be described.

Figure 8:
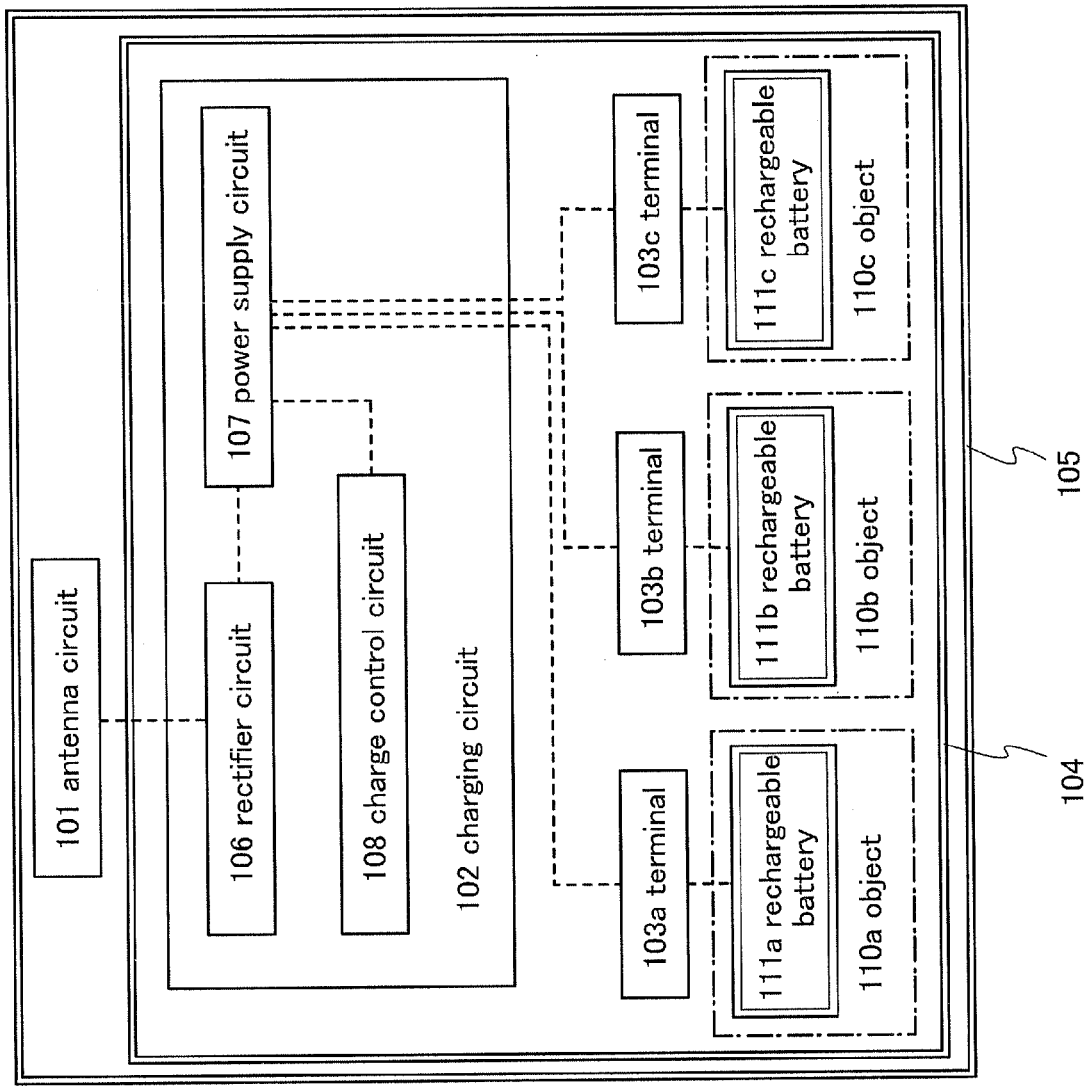
FIG. 8 is a block diagram showing a structure of a charging device of the present invention.

FIG. 8 shows a structure of a charging device which can supply electric power to an object to be charged through a terminal, similarly to the charging device shown in FIG. 1, and also can concurrently supply electric power to a plurality of objects to be charged. Note that, in FIG. 8, the elements which have already been shown in FIG. 1 are denoted by the same reference numerals as those in FIG. 1.

In the charging device shown in FIG. 8, electric energy is supplied from one power supply circuit 107 to rechargeable batteries 111a to 111c respectively included in three objects to be charged 110a to 110c. Specifically, current is supplied to the rechargeable batteries 111a to 111c through terminals 103a to 103c respectively corresponding to the objects to be charged 110a to 110c.

In the charging device shown in FIG. 8, the charging circuit 102 and the objects to be charged 110a to 110c are covered with the first protective material 104 or both the first protective material 104 and the second protective material 105, and the antenna circuit 101 is covered with the second protective material 105.

Note that, although the structure of the charging device which supplies electric power to three objects to be charged is exemplified in FIG. 8, the number of objects to be charged is not limited to three, and it may be two, four or more.

In addition, although FIG. 8 shows the structure of the charging device which supplies electric power from one charging circuit 107 to the plurality of objects to be charged, the present invention is not limited to this structure. A structure may also be employed in which a plurality of power supply circuits 107 is provided and electric power is supplied from each of the power supply circuits 107 to its respective object to be charged.

Figure 9:
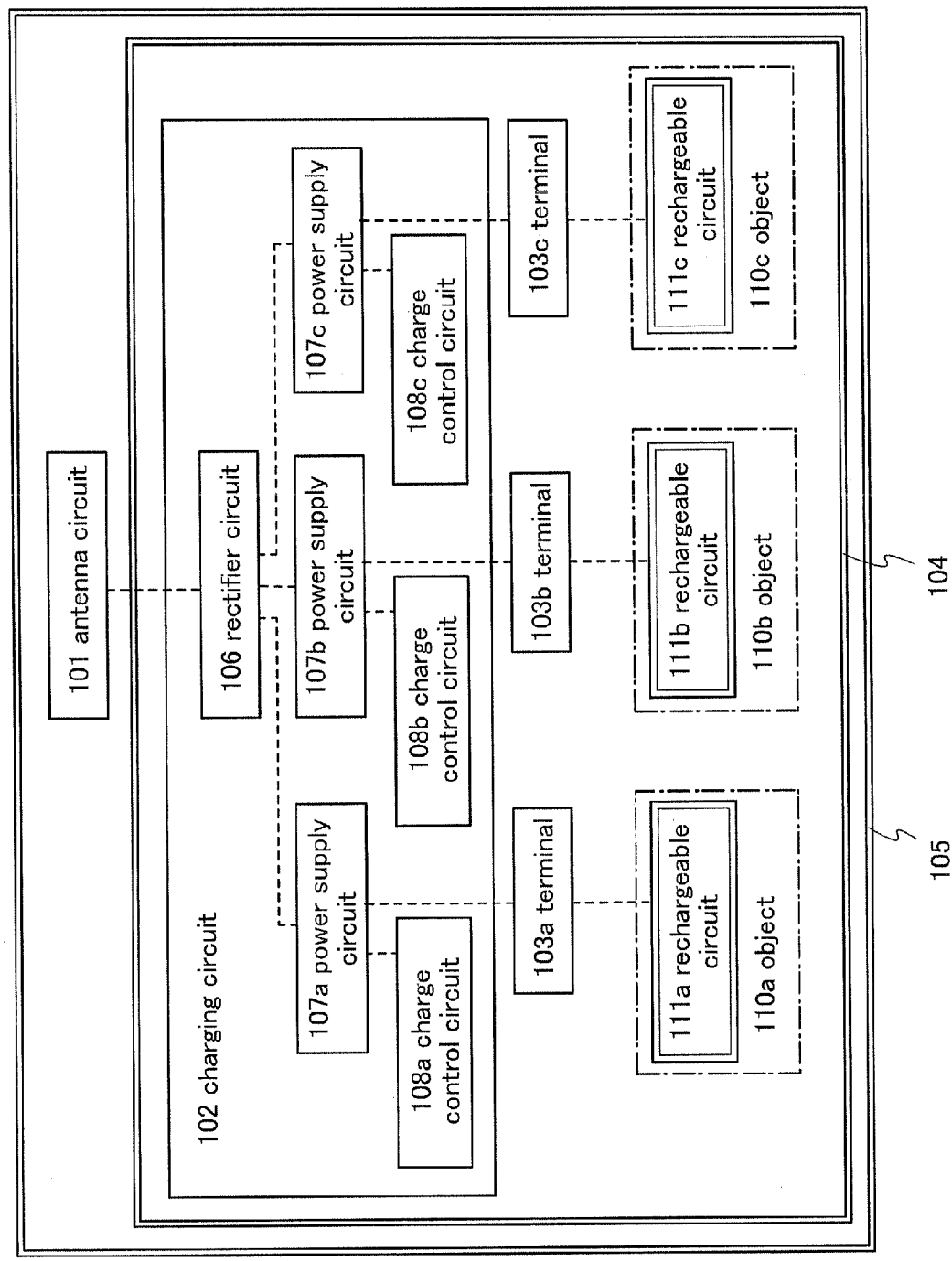
FIG. 9 is a block diagram showing a structure of a charging device of the present invention.

FIG. 9 shows a structure of a charging device which can supply electric power to a plurality of objects to be charged using a plurality of power supply circuits through terminals. Note that, in FIG. 9, the elements which have already been shown in FIG. 1 and FIG. 8 are denoted by the same reference numerals as those in FIG. 1 and FIG. 8.

In the charging device shown in FIG. 9, a plurality of power supply circuits 107a to 107c and charge control circuits 108a to 108c respectively corresponding to the power supply circuits 107a to 107c are provided, and coupled to the rectifier circuit 106. Note that, as described in Embodiment Mode 1, the charge control circuits 108a to 108c are not necessarily provided. Current is supplied from the power supply circuits 107a to 107c to rechargeable batteries 111a to 111c through the terminals 103a to 103c respectively corresponding to the objects to be charged 110a to 110c.

Note that, although the structure of the charging device which supplies electric power to three objects to be charged is exemplified in FIG. 9, the number of objects to be charged is not limited to three similarly to the case of FIG. 8, and it may be two, four or more.

In a case where a plurality of power supply circuits is used as in the charging device shown in FIG. 9, current with different magnitude can be concurrently supplied to each of the plurality of objects to be charged.

Note that the structure of the charging device shown in FIG. 8 and the structure of the charging device shown in FIG. 9 can be combined. That is, the charging device may include both the plurality of power supply circuits which supply electric power to the objects to be charged and one or the plurality of power supply circuits which supply electric power to the objects to be charged.

Figure 10:
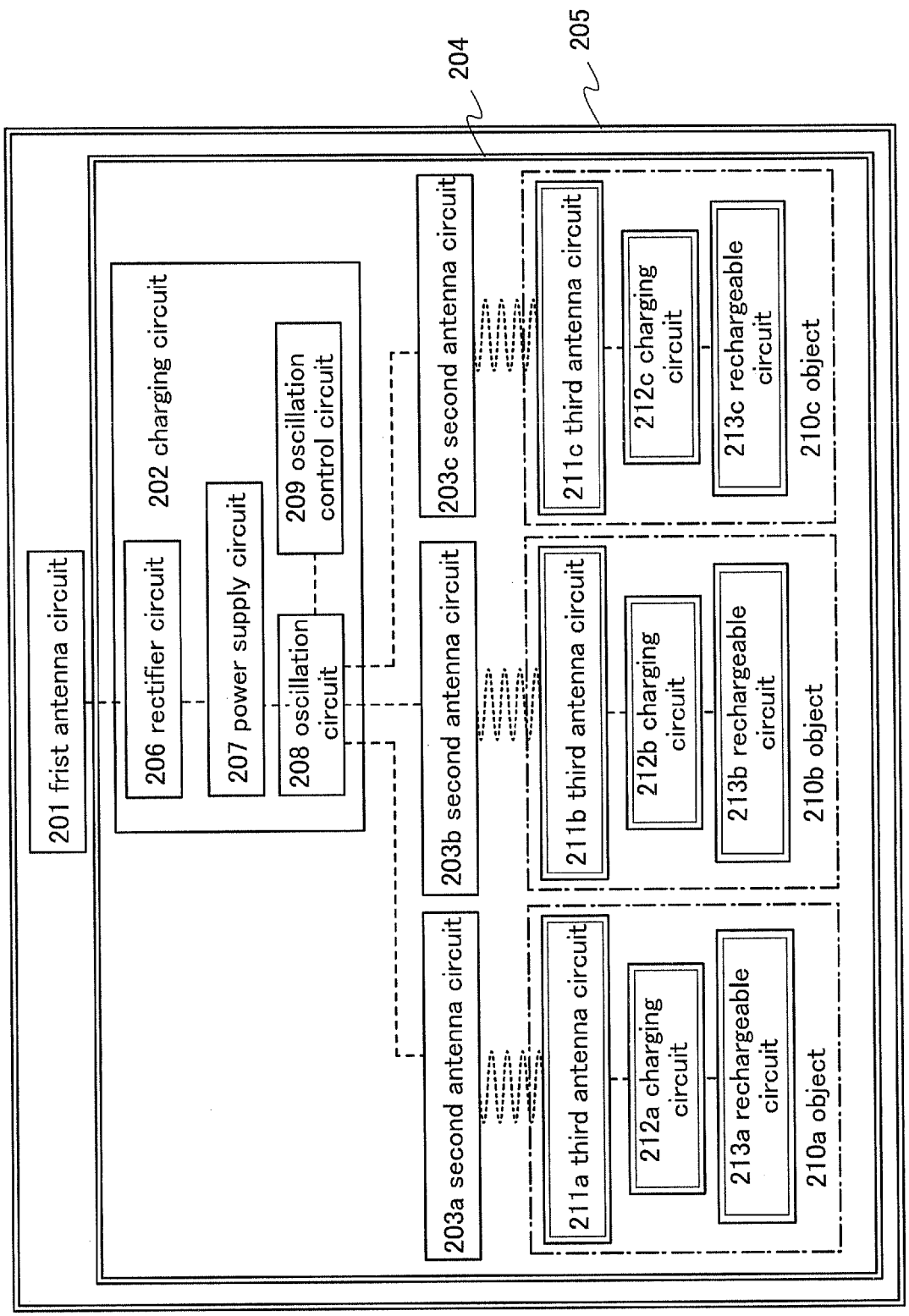
FIG. 10 is a block diagram showing a structure of a charging device of the present invention.

Next, FIG. 10 shows a structure of a charging device which can supply electric power to an object to be charged through a second antenna circuit wirelessly, similarly to the charging device shown in FIG. 3, and also can concurrently supply electric power to a plurality of objects to be charged. Note that, in FIG. 10, the elements which have already been shown in FIG. 3 are denoted by the same reference numerals as those in FIG. 3.

In the charging device shown in FIG. 10, electric power is supplied to rechargeable batteries 213a to 213c respectively included in three objects to be charged 210a to 210c, with the use of one power supply circuit 207 and one oscillation circuit 208.

Specifically, electric power is wirelessly supplied to third antenna circuits 211a to 211c respectively included in the objects to be charged 210a to 210c through second antenna circuits 203a to 203c respectively corresponding to the objects to be charged 210a to 210c. The electric power received by the third antenna circuits 211a to 211c is respectively outputted to charging circuits 212a to 212c as AC voltage. The charging circuits 212a to 212c generate DC voltage from the AC voltage and adjust the magnitude of the DC voltage. Then, current is supplied to each of the rechargeable batteries 213a to 213c, with the use of the adjusted DC voltage, so that the rechargeable batteries 213a to 213c are charged.

In the charging device shown in FIG. 10, the charging circuit 202 and the objects to be charged 210a to 210c are covered with the first protective material 204 or both the first protective material 204 and the second protective material 205, and the first antenna circuit 201 is covered with the second protective material 205.

Note that, although the structure of the charging device which supplies electric power to three objects to be charged is exemplified in FIG. 10, the number of objects to be charged is not limited to three, and it may be two, four or more.

In addition, although the structure of the charging device which supplies electric power from one power supply circuit 207 and one oscillation circuit 208 to the plurality of objects to be charged is shown in FIG. 10, the present invention is not limited to this structure. A structure may also be employed in which a plurality of power supply circuits and oscillation circuits are provided and electric power is supplied to a plurality of objects to be charged, with the use of the plurality of power supply circuits and oscillation circuits.

Figure 11:
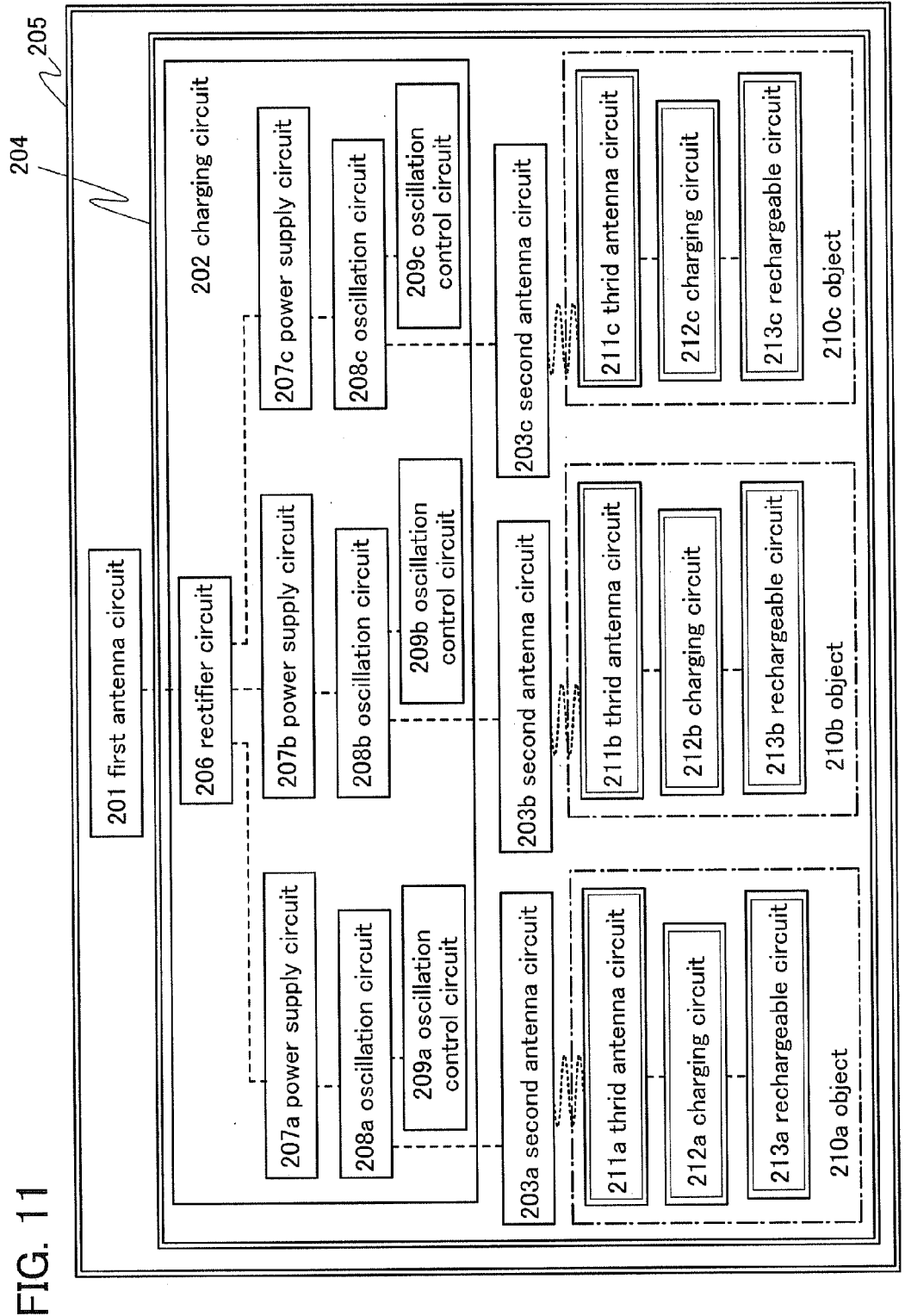
FIG. 11 is a block diagram showing a structure of a charging device of the present invention.

FIG. 11 shows a structure of a charging device which can wirelessly supply electric power to a plurality of objects to be charged, with the use of a plurality of power supply circuits and oscillation circuits. Note that, in FIG. 11, the elements which have already been shown in FIG. 3 and FIG. 10 are denoted by the same reference numerals as those in FIG. 3 and FIG. 10.

In the charging device shown in FIG. 11, a plurality of power supply circuits 207a to 207c, a plurality of oscillation circuit 208a to 208c, and a plurality of oscillation control circuits 209a to 209c respectively corresponding to the oscillation circuits 208a to 208c are provided, and coupled to the rectifier circuit 206. As described in Embodiment Mode 2, the oscillation control circuits 209a to 209c are not necessarily provided. Electric power is wirelessly supplied to the third antenna circuits 211a to 211c through the second antenna circuits 203a to 203c respectively corresponding to the objects to be charged 210a to 210c.

Note that, although the structure of the charging device which supplies electric power to three objects to be charged is exemplified in FIG. 11, the number of objects to be charged is not limited to three similarly to the case of FIG. 10, and it may be two, four or more.

In a case where a plurality of power supply circuits and a plurality of oscillation circuits are used as in the charging device shown in FIG. 11, electric power with different magnitude can be concurrently supplied to each of the plurality of objects to be charged.

Note that the structure of the charging device shown in FIG. 10 and the structure of the charging device shown in FIG. 11 can be combined. That is, the charging device may include both a combination of the plurality of power supply circuits and oscillation circuits which supply electric power to the objects to be charged and a combination of one or the plurality of power supply circuits and oscillation circuits which supply electric power to the objects to be charged.

In addition, the structure of the charging device shown in FIG. 8 or FIG. 9 and the structure of the charging device shown in FIG. 10 or FIG. 11 can be combined. That is, the charging device of the present invention may include both a function of supplying electric power to the objects to be charged through the terminals and a function of supplying electric power to the objects to be charged through the second antenna circuits.

Next, a specific structure of the charging device shown in FIG. 8 or FIG. 9 is described.

Figure 12A:
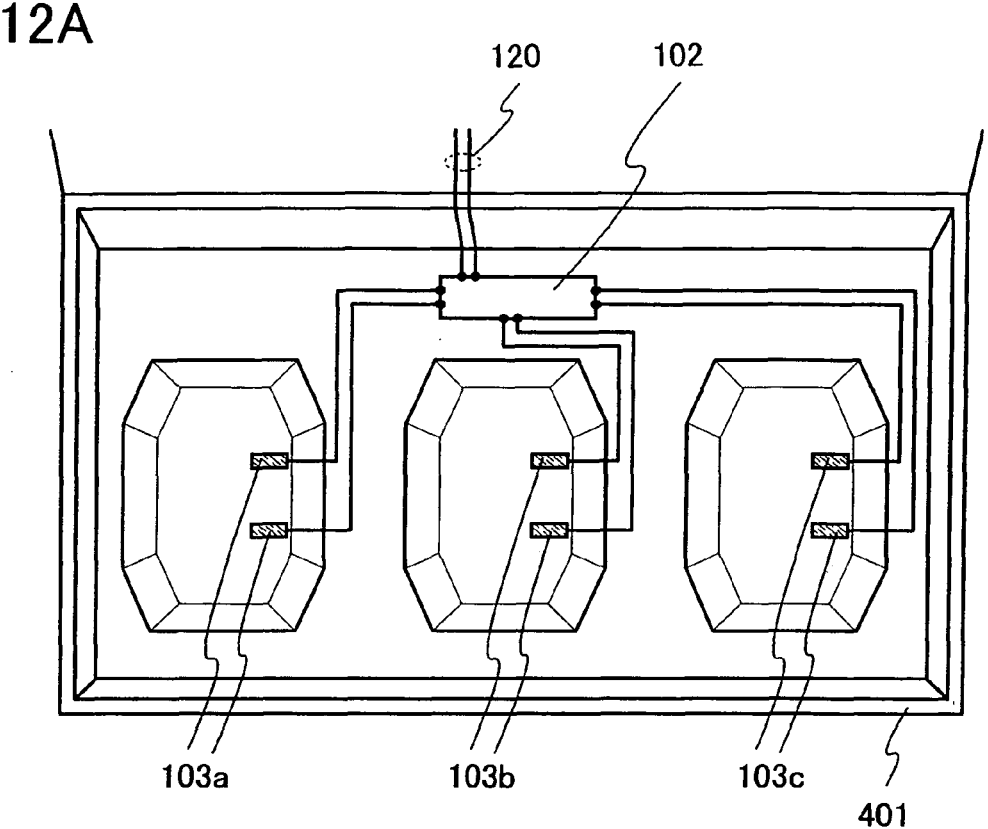
FIGS. 12A and 12B are top views each showing an internal structure of a charging device of the present invention.

FIG. 12A shows a state in which the charging circuit 102 is placed inside a housing 401 included in the charging device shown in FIG. 8 or FIG. 9. The housing 401 functions as the first protective material 104. AC voltage is inputted from the antenna circuit 101 to the charging circuit 102 through wirings 120. The charging circuit 102 and the plurality of terminals 103a to 103c are electrically connected. The objects to be charged 110a to 110c, or the rechargeable batteries 111a to 111c taken out of the objects to be charged 110a to 110c are placed inside the housing 401 so as to be electrically connected to the charging circuit 102 through the terminals 103a to 103c.

Figure 12B:
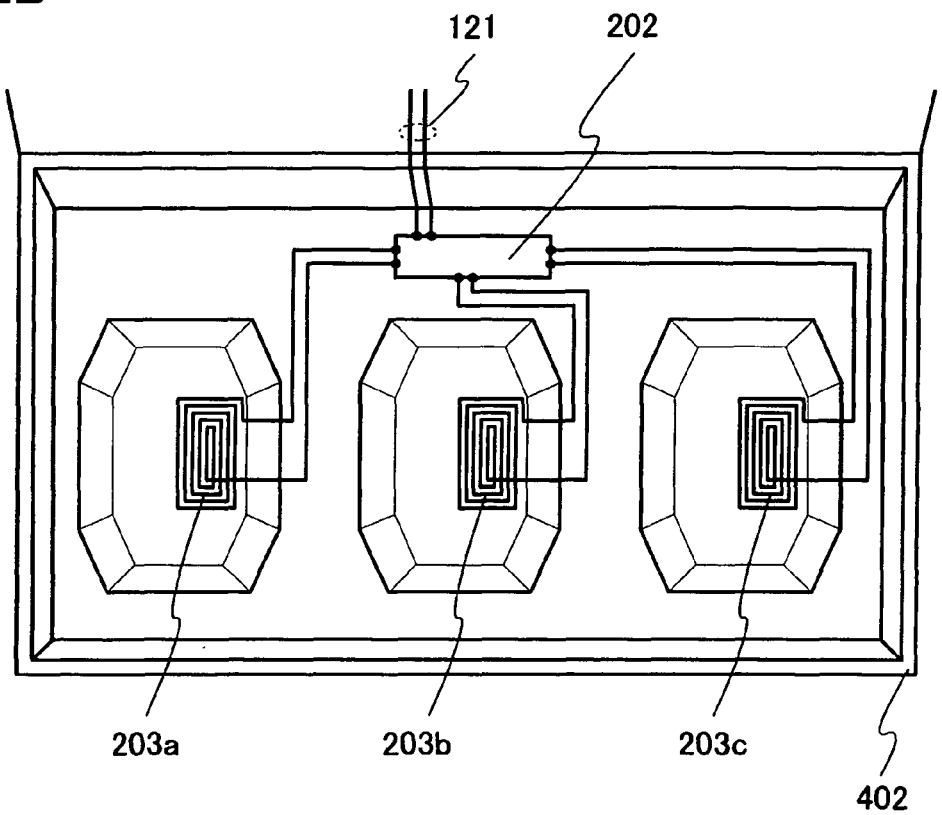

In addition, FIG. 12B shows a state in which the charging circuit 202 is placed inside a housing 402 included in the charging device shown in FIG. 10 or FIG. 11. The housing 402 functions as the first protective material 204. AC voltage is inputted from the first antenna circuit 201 to the charging circuit 202 through wirings 121. The charging circuit 202 and the plurality of second antenna circuits 203a to 203c are electrically connected. The objects to be charged 210a to 210c, or the third antenna circuits 211a to 211c, the charging circuits 212a to 212c, and the rechargeable batteries 213a to 213c which are taken out of the objects to be charged 210a to 210c are placed inside the housing 402 so that electric power is supplied from the charging circuit 202 thereto through the plurality of second antenna circuits 203a to 203c.

Note that, although FIG. 12B shows an example in which a coiled antenna is used for the second antenna circuits 203a to 203c, the shape of the antenna is not limited to the coil shape.

Embodiment 1

In this embodiment, an example of an outer appearance of an antenna circuit or a first antenna circuit (hereinafter, in this embodiment, simply referred to as an antenna circuit) included in the charging device of the present invention will be described.

Figure 13A:
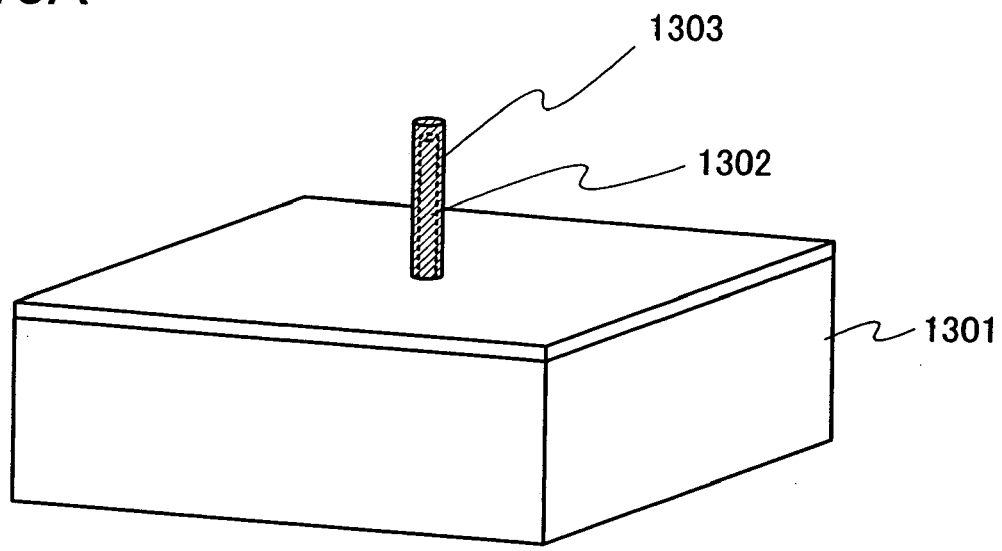
FIGS. 13A and 13B are respectively a perspective view showing an outer appearance of a charging device and a view showing a cross-sectional structure of an antenna circuit.

FIG. 13A is a perspective view showing an outer appearance of a charging device of this embodiment. An antenna circuit 1303 covered with a second protective material 1302 is provided for a housing 1301 which functions as a first protective material.

Figure 13B:
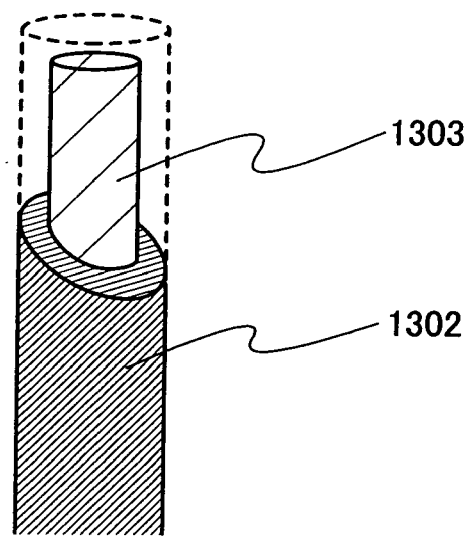

In FIG. 13B, a structure of the second protective material 1302 and the antenna circuit 1303 which are shown in FIG. 13A are shown in more detail. A structure in which part of the second protective material 1302 is removed is shown in FIG. 13B in order to show the structure of the antenna circuit 1303 in an understandable way. As shown in FIG. 13B, the antenna circuit 1303 is covered with the second protective material 1302 and protected physically by the second protective material 1302.

This embodiment can be implemented in combination with any of the above-described embodiment modes as appropriate.

Embodiment 2

In this embodiment mode, a specific placement position of the charging device of the present invention will be described.

Figure 14A:
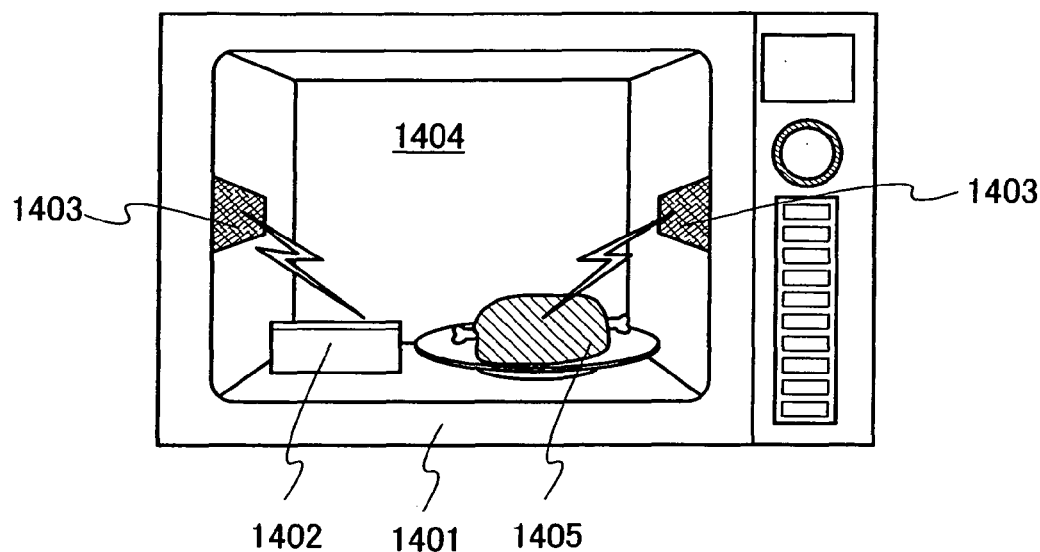
FIGS. 14A and 14B are diagrams each showing a placement position of a charging device of the present invention.

FIG. 14A shows an example in which a charging device 1402 of the present invention is placed in an inside 1404 of a high-frequency heating apparatus 1401. In the high-frequency heating apparatus 1401, electromagnetic waves generated by a high-frequency device placed inside the high-frequency heating apparatus 1401 can be emitted from an irradiation part 1403 to an object to be processed 1405 such as food which is set in the inside 1404. The charging device 1402 is placed in the inside 1404, so that not only the object to be processed 1405 but also the charging device 1402 is irradiated with electromagnetic waves. The charging device 1402 can supply electric power to an object to be charged placed inside the charging device 1402 using emitted electromagnetic waves.

Figure 14B:
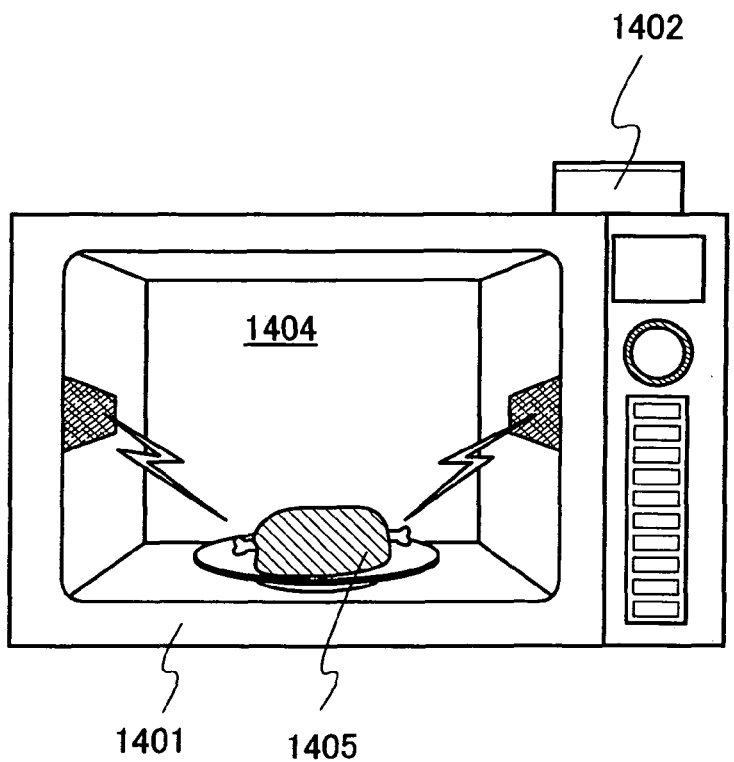

Next, FIG. 14B shows an example in which the charging device 1402 of the present invention is placed outside the high-frequency heating apparatus 1401. In FIG. 14B, the charging device 1402 can supply electric power to an object to be charged placed inside the charging device 1402 using electromagnetic waves leaking to outside the high-frequency heating apparatus 1401. Electric power is supplied to the object to be charged inside the charging device 1402, with the use of leaking electromagnetic waves as in FIG. 14B, so that surplus radio waves which would normally be left without being used can be reused as electric energy.

Note that, although FIG. 14B shows the example in which the charging device 1402 is placed on the high-frequency heating apparatus 1401, the present invention is not limited to this structure. The charging device 1402 may be placed at the side of the high-frequency heating apparatus 1401 or under the high-frequency heating apparatus 1401. In addition, the charging device 1402 is placed so as to be in contact with the high-frequency heating apparatus 1401 at the time of placement, so that electromagnetic waves leaking to the outside the high-frequency heating apparatus 1401 can be received by the charging device 1402 more efficiently. However, the present invention is not limited to this structure. The charging device 1402 can be placed at a certain distance from the high-frequency heating apparatus 1401.

In addition, a placement position of the charging device 1402 of the present invention can be changed as appropriate by users. For example, in a case where electric power is needed to be supplied to an object to be charged as quickly as possible, the charging device 1402 is preferably placed in the inside 1404 capable of receiving more powerful electromagnetic waves, as shown in FIG. 14A. On the other hand, in a case where electric power is not needed to be supplied to an object to be charged as quickly as possible and energy saving is more important, the charging device 1402 is preferably placed outside the high-frequency heating apparatus 1401, as shown in FIG. 14B.

Figure 15A:
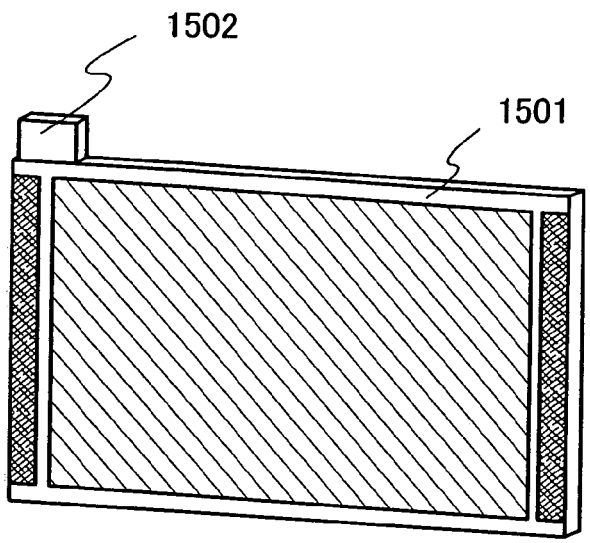
FIGS. 15A and 15B are diagrams each showing a placement position of a charging device of the present invention.

Next, FIG. 15A shows an example in which a charging device 1502 of the present invention is placed at a display device 1501 such as a monitor of a television or a computer. The charging device 1502 supplies electric power to an object to be charged inside the charging device 1502 using electromagnetic waves generated from the display device 1501, so that surplus radio waves which would normally be left without being used can be reused as electric energy.

Note that, although FIG. 15A shows the example in which the charging device 1502 is placed on the display device 1501, the present invention is not limited to this structure. The charging device 1502 may be placed at the side of the display device 1501 or under the display device 1501. In addition, the charging device 1502 is placed so as to be in contact with the display device 1501 at the time of placement, so that electromagnetic waves leaking to outside the display device 1501 can be received by the charging device 1502 more efficiently. However, the present invention is not limited to this structure. The charging device 1502 can be placed at a certain distance from the display device 1501.

Figure 15B:
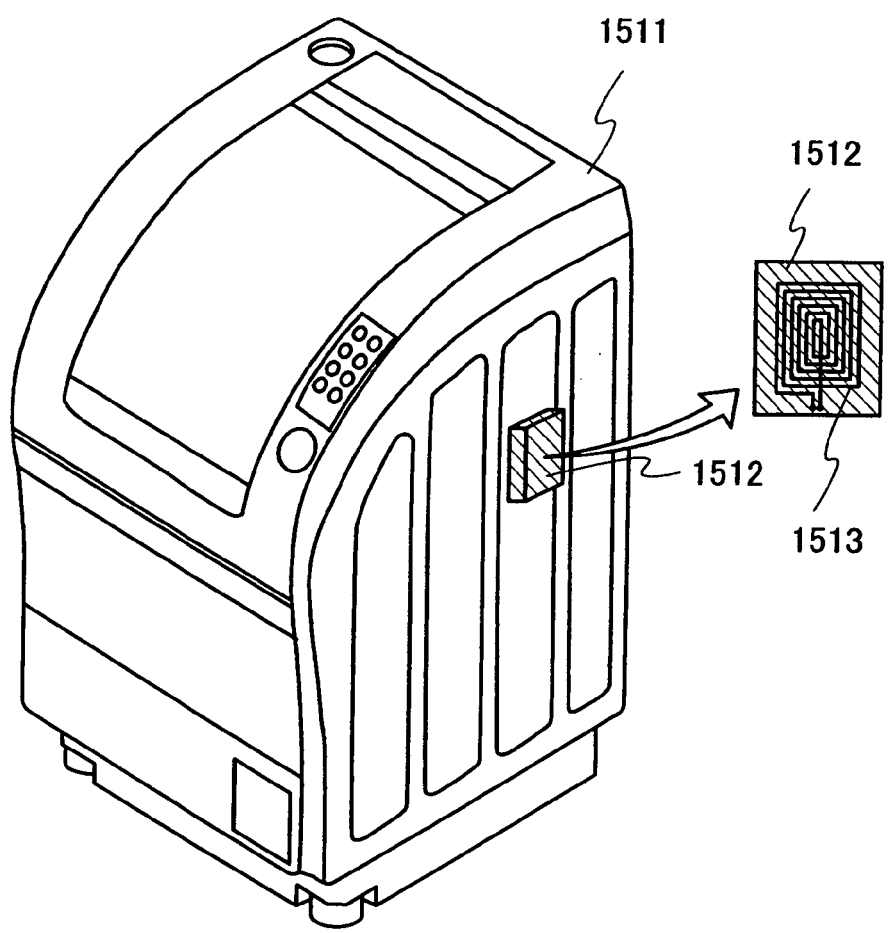

Next, FIG. 15B shows an example in which a charging device 1512 of the present invention is placed at a washing machine 1511. The charging device 1512 supplies electric power to an object to be charged inside the charging device 1512 using electromagnetic waves generated from a motor of the washing machine 1511, so that surplus radio waves which would normally be left without being used can be reused as electric energy.

Note that, although FIG. 15B shows the example in which the charging device 1512 is placed at the side of the washing machine 1511, the present invention is not limited to this structure. The charging device 1512 may be placed on the washing machine 1511 or under the washing machine 1511 if possible. In addition, the charging device 1512 is placed so as to be in contact with the washing machine 1511 at the time of placement, so that electromagnetic waves leaking to outside the washing machine 1511 can be received by the charging device 1512 more efficiently. However, the present invention is not limited to this structure. The charging device 1512 can be placed at a certain distance from the washing machine 1511.

In addition, it is desirable that the charging device 1512 be placed so that an antenna circuit or a first antenna circuit (hereinafter, in this embodiment, simply referred to as an antenna circuit) 1513 included in the charging device 1512 is closest to the washing machine 1511 at the time of placement.

This embodiment can be implemented in combination with any of the above-described embodiment modes or the above-described embodiment as appropriate.

Embodiment 3

Next, a manufacturing method of various circuits used for the charging device of the present invention will be described in detail. Note that, although a thin film transistor (TFT) is described as an example of a semiconductor element in this embodiment, the semiconductor element used in the present invention is not limited to the TFT. For example, a memory element, a diode, a resistor, a capacitor, an inductor, or the like can be used as well as the TFT.

First, as shown in FIG. 16A, an insulating film 701, a peeling layer 702, an insulating film 703 functioning as a base film, and a semiconductor film 704 are formed in this order over a substrate 700 with heat resistance. The insulating film 701, the peeling layer 702, the insulating film 703, and the semiconductor film 704 can be formed consecutively.

As the substrate 700, for example, a glass substrate made of barium borosilicate glass, aluminoborosilicate glass, or the like, a quartz substrate, a ceramic substrate, or the like can be used. Alternatively, a metal substrate such as a stainless steel substrate or a semiconductor substrate such as a silicon substrate may be used. A substrate formed of a synthetic resin having flexibility such as plastic generally tends to have lower allowable temperature limit than the above-described substrates; however, the substrate can be used as long as it can resist a processing temperature in manufacturing steps.

For a plastic substrate, the following can be used: polyester typified by polyethylene terephthalate (PET); polyether sulfone (PES); polyethylene naphthalate (PEN); polycarbonate (PC); nylon; polyether etherketone (PEEK); polysulfone (PSF); polyether imide (PEI); polyarylate (PAR); polybutylene terephthalate (PBT); polyimide; an acrylonitrile butadiene styrene resin; poly vinyl chloride; polypropylene; poly vinyl acetate; an acrylic resin; and the like.

Note that, although the peeling layer 702 is formed over an entire surface of the substrate 700 in this embodiment, the present invention is not limited to this structure. For example, the peeling layer 702 may be partially formed over the substrate 700 by photolithography or the like.

The insulating film 701 and the insulating film 703 are each formed using a material with an insulating property, such as silicon oxide, silicon nitride (e.g., $SiN_x$ or $Si_3N_4$), silicon oxynitride ($SiO_xN_y$) (x>y>0), or silicon nitride oxide ($SiN_xO_y$) (x>y>0) by a CVD method, a sputtering method, or the like.

The insulating film 701 and the insulating film 703 are provided in order to prevent an alkali metal such as Na or an alkaline earth metal contained in the substrate 700 from diffusing into the semiconductor film 704 and having an adverse effect on characteristics of a semiconductor element such as a TFT. In addition, the insulating film 703 has a function of preventing an impurity element contained in the peeling layer 702 from diffusing into the semiconductor film 704 and also has a function of protecting the semiconductor element in a later step of peeling off the semiconductor element.

The insulating film 701 and the insulating film 703 may be formed using a single insulating film or a stacked layer in which a plurality of insulating films are stacked. In this embodiment, the insulating film 703 is formed in such a manner that a silicon oxynitride film with a thickness of 100 nm, a silicon nitride oxide film with a thickness of 50 nm, and a silicon oxynitride film with a thickness of 100 nm are stacked in this order. However, a material and thickness of each layer and the number of stacked layers are not limited thereto. For example, instead of the lower silicon oxynitride film, a siloxane-based resin with a thickness of 0.5 to 3 µm may be formed by a spin coating method, a slit coater method, a droplet discharge method, a printing method, or the like. Instead of the middle silicon nitride oxide film, a silicon nitride film (e.g., $SiN_x$ or $Si_3N_4$) may be used. Instead of the upper silicon oxynitride film, a silicon oxide film may be used. In addition, the thickness of each film is preferably 0.05 to 3 µm and can be freely selected from the range.

Alternatively, the lower layer which is closest to the peeling layer 702, the middle layer, and the upper layer of the insulating film 703 may be formed of a silicon oxynitride film or a silicon oxide film, a siloxane-based resin, and a silicon oxide film, respectively.

Note that a siloxane-based resin corresponds to a resin including a Si—O—Si bond formed using a siloxane-based material as a starting material. A siloxane-based resin may have at least one of fluorine, an alkyl group, and aromatic hydrocarbon, as well as hydrogen, as a substituent.

A silicon oxide film can be formed using a mixed gas of silane and oxygen, TEOS (tetraethoxysilane) and oxygen, or the like by a method such as a thermal CVD method, a plasma CVD method, a normal pressure CVD method, or a bias ECRCVD method. In addition, a silicon nitride film can be typically formed using a mixed gas of silane and ammonia by a plasma CVD method. Moreover, a silicon oxynitride film and a silicon nitride oxide film can typically be formed using a mixed gas of silane and dinitrogen monoxide by a plasma CVD method.

For the peeling layer 702, a metal film, a metal oxide film, or a film in which a metal film and a metal oxide film are stacked can be used. Each of the metal film and the metal oxide film may be a single layer or a stacked layer in which a plurality of layers are stacked. Metal nitride or metal oxynitride may be used as well as the metal film or the metal oxide film. The peeling layer 702 can be formed by a sputtering method, various CVD methods such as a plasma CVD method, or the like.

As a metal used for the peeling layer 702, the following can be given: tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), iridium (Ir), or the like. The peeling layer 702 may be formed using a film formed of an alloy containing any of the above-described metals as a main component or a film formed of a compound containing any of the above-described metals as well as a film formed of any of the above-described metals.

The peeling layer 702 may be formed using a film formed of silicon (Si) or a film formed of a compound containing silicon (Si) as a main component. Alternatively, a film formed of an alloy of silicon (Si) and any of the above-described metals may be used. A film containing silicon may have any of an amorphous structure, a microcrystalline structure, and polycrystalline structure.

The peeling layer 702 may be formed using a single layer of the above-described film or a stacked layer in which a plurality of above-described films are stacked. The peeling layer 702 in which a metal film and a metal oxide film are stacked can be formed in such a manner that a metal film is formed, and then a surface of the metal film is oxidized or nitrided. Specifically, plasma treatment may be performed to the metal film in an oxygen atmosphere or a dinitrogen monoxide atmosphere, or heating treatment may be performed to the metal film in an oxygen atmosphere or a dinitrogen monoxide atmosphere. In addition, the metal film can also be oxidized in such a manner that a silicon oxide film or a silicon oxynitride film is formed so as to be in contact with the metal film. Moreover, the metal film can be nitrided in such a manner that a silicon oxynitride film or a silicon nitride film is formed so as to be in contact with the metal film.

As plasma treatment for oxidizing or nitriding the metal film, high-density plasma treatment may be performed in which the plasma density is greater than or equal to $1\times10^{11}$ $cm^{-3}$, preferably in the range of $1\times10^{11}$ $cm^{-3}$ to $9\times10^{15}$ $cm^{-3}$, and a high-frequency wave such as a microwave (e.g., a frequency of 2.45 GHz) is used.

Note that, although the peeling layer 702 in which the metal film and the metal oxide film are stacked may be formed by oxidation of the surface of the metal film, the metal oxide film may be separately formed after the metal film is formed.

For example, in a case of using tungsten as a metal, a tungsten film is formed by a sputtering method, a CVD method, or the like as the metal film, and then plasma treatment is performed to the tungsten film. Accordingly, the tungsten film corresponding to the metal film and a metal oxide film which is in contact with the metal film and formed of an oxide of tungsten can be formed.

Note that the oxide of tungsten is expressed by $WO_x$. X is in the range of greater than or equal to 2 and less than or equal to 3; there are $WO_2$ in a case where x is 2, $W_2O_5$ in a case where x is 2.5, $W_4O_{11}$ in a case where x is 2.75, $WO_3$ in a case where x is 3, and the like. When forming the oxide of tungsten, the value of x is not particularly limited and may be defined depending on an etching rate or the like.

It is desirable that the semiconductor film 704 be formed without being exposed to the air after the insulating film 703 is formed. The thickness of the semiconductor film 704 is 20 to 200 nm (desirably, 40 to 170 nm, preferably, 50 to 150 nm). Note that the semiconductor film 704 may be an amorphous semiconductor or a polycrystalline semiconductor. Not only silicon but also silicon germanium can be used as the semiconductor. In a case of using silicon germanium, the concentration of germanium is preferably about 0.01 to 4.5 atomic %.

Note that the semiconductor film 704 may be crystallized by a known technique. As a known crystallization method, there are a laser crystallization method using laser light and a crystallization method using a catalyst element. Alternatively, a crystallization method using a catalyst element and a laser crystallization method can be combined. In a case where a substrate which is excellent in heat resistance, such as a quartz substrate, is used as the substrate 700, a combination of any of a thermal crystallization method using an electrically-heated furnace, a lamp annealing crystallization method using infrared light, a crystallization method using a catalyst element, and a high-temperature annealing at about 950° C. may be used for a crystallization method.

For example, in a case of using laser crystallization, heat treatment at 550° C. for 4 hours is performed to the semiconductor film 704 before the laser crystallization, in order to increase resistance of the semiconductor film 704 against a laser beam. A crystal with a large grain diameter can be obtained with the use of a solid laser capable of continuous oscillation and by irradiation with laser light of the second to fourth harmonics. Typically, it is desirable to use the second harmonic (532 nm) or the third harmonic (355 nm) of an Nd:YVO$_4$ laser (the fundamental wave: 1064 nm). Specifically, laser light emitted from a continuous-wave YVO$_4$ laser is converted into a harmonic by a nonlinear optical element, so that laser light with an output of 10 W is obtained. Then, the laser light is preferably shaped into a rectangular shape or an elliptical shape on an irradiated surface by an optical system to be emitted to the semiconductor film 704. At this time, an energy density of about 0.01 to 100 MW/cm$^2$ (preferably, 0.1 to 10 MW/cm$^2$) is needed. Then, the laser light is emitted at a scanning rate of about 10 to 2000 cm/sec.

As a continuous-wave gas laser, an Ar laser, a Kr laser, or the like can be used. In addition, as a continuous-wave solid laser, a YAG laser, a YVO$_4$ laser, a YLF laser, a YAlO$_3$ laser, a forsterite (Mg$_2$SiO$_4$) laser, a GdVO$_4$ laser, a Y$_2$O$_3$ laser, a glass laser, a ruby laser, an alexandrite laser, a Ti: sapphire laser, or the like can be used.

As a pulsed laser, the following can be used, for example: an Ar laser, a Kr laser, an excimer laser, a CO$_2$ laser, a YAG laser, a Y$_2$O$_3$ laser, a YVO$_4$ laser, a YLF laser, a YAlO$_3$ laser, a glass laser, a ruby laser, an alexandrite laser, a Ti: sapphire laser, a copper vapor laser, or a gold vapor laser.

In addition, the laser crystallization may also be performed by a pulsed laser at a repetition rate of greater than or equal to 10 MHz, which is a drastically higher high frequency band than a generally used frequency band of several tens to several hundreds of Hz. It is said that it takes several tens to several hundreds of nanoseconds for the semiconductor film 704 to be completely solidified after being irradiated with the pulsed laser light. Thus, when the above-described repetition rate is used, it is possible to irradiate the semiconductor film 704 with pulsed laser light before the semiconductor film 704 is solidified after it has been melted by previous laser light. Therefore, a solid-liquid interface can be continuously moved in the semiconductor film 704, so that the semiconductor film 704 having crystal grains, which continuously grow in a scanning direction, can be obtained. Specifically, it is possible to form an aggregation of contained crystal grains each of which has a width of about 10 to 30 μm in the scanning direction and a width of about 1 to 5 μm in a direction perpendicular to the scanning direction. It is also possible to form the semiconductor film 704 having almost no grain boundaries at least in the channel direction of a TFT by formation of single crystal grains continuously growing along the scanning direction.

Note that the laser crystallization may be performed so that fundamental wave laser light of a continuous-wave laser and harmonic laser light of a continuous-wave laser light are concurrently emitted, or fundamental wave laser light, of a continuous-wave laser and harmonic laser light of pulsed oscillation are concurrently emitted.

Note that laser light may be emitted in an atmosphere containing an inert gas such as a rare gas or nitrogen. This makes it possible to suppress roughness of a surface of the semiconductor due to laser irradiation and suppress variation in threshold voltage caused by variation in interface state density.

The semiconductor film 704 with increased crystallinity is formed by the above-described laser irradiation. Note that a polycrystalline semiconductor formed in advance by a sputtering method, a plasma CVD method, a thermal CVD method, or the like may be used for the semiconductor film 704.

In addition, although the semiconductor film 704 is crystallized in this embodiment, the semiconductor film 704 which is an amorphous semiconductor film or a microcrystalline semiconductor film without being crystallized may go on to a process described below. Since a TFT using an amorphous semiconductor or a microcrystalline semiconductor needs fewer manufacturing steps than a TFT using a polycrystalline semiconductor, the TFT using an amorphous semiconductor or a microcrystalline semiconductor has an advantage that cost can be reduced and yield can be increased.

The amorphous semiconductor can be obtained by glow discharge decomposition of a gas containing silicon. As the gas containing silicon, SiH$_4$ and Si$_2$HF are given. Those gases containing silicon may be used by being diluted with hydrogen, or hydrogen and helium.

Next, channel doping is performed, by which an impurity element imparting p-type conductivity or an impurity element imparting n-type conductivity is added to the semiconductor film 704 at a low concentration. The channel doping may be performed to the whole semiconductor film 704 or part of the semiconductor film 704 as selected. As the impurity element imparting p-type conductivity, boron (B), aluminum (Al), gallium (Ga), or the like can be used. As the impurity element imparting n-type conductivity, phosphorus (P), arsenic (As), or the like can be used. In this embodiment, boron (B) is used as the impurity element and added so as to be contained at concentrations of $1\times10^{16}$ to $5\times10^{17}/cm^3$.

Next, as shown in FIG. 16B, the semiconductor film 704 is processed (patterned) into a predetermined shape to form island-shaped semiconductor films 705 to 707. Then, a gate insulating film 708 is formed so as to cover the island-shaped semiconductor films 705 to 707. The gate insulating film 708 can be formed of a single layer or a stacked layer of a film containing silicon nitride, silicon oxide, silicon nitride oxide, and/or silicon oxynitride by a plasma CVD method, a sputtering method, or the like. In a case of stacking the films, for example, a three-layer structure is preferably employed in which a silicon oxide film, a silicon-nitride film, and a silicon oxide film are stacked from the substrate 700 side.

The gate insulating film 708 may also be formed by oxidation or nitridation of surfaces of the island-shaped semiconductor films 705 to 707 by high-density plasma treatment. For example, the high-density plasma treatment is performed with the use of a mixed gas of a rare gas such as He, Ar, Kr, or Xe and oxygen, nitrogen oxide, ammonia, nitrogen, hydrogen, or the like. In this case, when excitation of plasma is performed by introduction of a microwave, plasma with a low electron temperature and high density can be generated. The surfaces of the semiconductor films are oxidized or nitrided by an oxygen radical (there is a case where an OH radical is included) or a nitrogen radical (there is a case where an NH radical is included) generated by such high-density plasma, so that an insulating film with a thickness of 1 to 20 nm, typically 5 to 10 nm, is formed so as to be in contact with the semiconductor film. This insulating film with a thickness of 5 to 10 nm is used as the gate insulating film 708.

Since the oxidation or nitridation of the semiconductor film by the above-described high-density plasma treatment progresses under a solid-phase reaction, interface state density between the gate insulating film and the semiconductor film can be extremely low. In addition, the semiconductor films are directly oxidized or nitrided by the high-density plasma treatment, so that variation in the thickness of the insulating film to be formed can be suppressed. Moreover, in a case where the semiconductor films have crystallinity, the surfaces of the semiconductor films are oxidized under a solid-phase reaction using the high-density plasma treatment, so that rapid oxidation only in crystal grain boundaries can be prevented and a gate insulating film with good uniformity and low interface state density can be formed. A transistor including the insulating film formed by the high-density plasma treatment in part of the gate insulating film or as the whole gate insulating film of the transistor can have little variation in the characteristics.

Next, as shown in FIG. 16C, a conductive film is formed over the gate insulating film 708, and then the conductive film is processed (patterned) into a predetermined shape, so that an electrode 709 is formed over the island-shaped semiconductor films 705 to 707. In this embodiment, the electrode 709 is formed by patterning of two stacked conductive films. The conductive films can be formed using tantalum (Ta), tungsten (W), titanium (Ti), molybdenum (Mo), aluminum (Al), copper (Cu), chromium (Cr), niobium (Nb), or the like. Alternatively, an alloy containing any of the above-described metals as a main component or a compound containing any of the above-described metals may be used. Further alternatively, the conductive film may be formed using a semiconductor such as polycrystalline silicon formed by addition of an impurity element imparting conductivity, such as phosphorus, to a semiconductor film.

In this embodiment, a tantalum nitride film or a tantalum film is used as a first conductive film and a tungsten film is used as a second conductive film. As a combination of two conductive films, a tungsten nitride film and a tungsten film; a molybdenum nitride film and a molybdenum film; an aluminum film and a tantalum film; an aluminum film and a titanium film; or the like can be given as well as the example described in this embodiment. Since tungsten or tantalum nitride has high heat resistance, heat treatment for the purpose of thermal activation can be performed in a step after forming the two conductive films. Alternatively, as a combination of two conductive films, for example, silicon doped with an impurity imparting n-type conductivity and nickel silicide, Si doped with an impurity imparting n-type conductivity and $WSi_x$, or the like can be used.

In addition, although the electrode 709 is formed of two stacked conductive films in this embodiment, this embodiment is not limited to this structure. The electrode 709 may be formed of a single conductive film or a stacked layer of three or more layers. In a case of a three-layer structure in which three or more layers are stacked, a stacked structure of a molybdenum film, an aluminum film, and a molybdenum film may be employed.

A CVD method, a sputtering method, or the like can be used for forming the conductive film. In this embodiment, the first conductive film is formed to have a thickness of 20 to 100 nm and the second conductive film is formed to have a thickness of 100 to 400 nm.

As a mask used when forming the electrode 709, silicon oxide, silicon oxynitride, or the like may be used instead of a resist. Although a step of forming a mask of silicon oxide, silicon oxynitride, or the like by patterning is added in this case, there is less reduction in thickness and width of the mask at the time of etching than a case of using a resist; thus, the electrode 709 with a desired width can be formed. Alternatively, the electrode 709 may be formed selectively by a droplet discharge method without using a mask.

Note that a droplet discharge method refers to a method in which droplets containing a predetermined composition are discharged from a pore to form a predetermined pattern, and an ink-jet method or the like is included in the category.

Next, the island-shaped semiconductor films 705 to 707 are doped with an impurity element imparting n-type conductivity (typically, P (phosphorus) or As (arsenic)) at a low concentration with the electrode 709 used as a mask (a first doping step). Although the first doping step is performed under the following conditions: a dose of $1\times10^{15}$ to $1\times10^{19}$/$cm^3$ and an acceleration voltage of 50 to 70 keV, the present invention is not limited to these conditions. In this first doping step, doping is performed through the gate insulating film 708, so that a low concentration impurity region 710 is formed in each of the island-shaped semiconductor films 705 to 707. Note that the first doping step may be performed with the island-shaped semiconductor film 707, which becomes a p-channel TFT, covered with a mask.

Next, as shown in FIG. 17A, a mask 711 is formed so as to cover the island-shaped semiconductor films 705 and 706 which become n-channel TFTs. Then, the island-shaped semiconductor film 707 is doped with an impurity element imparting p-type conductivity (typically, B (boron)) at a high concentration with the electrode 709 used as a mask in addition to the mask 711 (a second doping step). The second doping step is performed under the following conditions: a dose of $1\times10^{19}$ to $1\times10^{20}$/$cm^3$ and an acceleration voltage of 20 to 40 keV. In this second doping step, doping is performed through the gate insulating film 708, so that p-type high concentration impurity regions 712 are formed in the island-shaped semiconductor film 707.

Next, as shown in FIG. 17B, the mask 711 is removed by ashing or the like, and then an insulating film is formed so as to cover the gate insulating film 708 and the electrode 709. The insulating film is formed of a single layer or a stacked layer of a silicon film, a silicon oxide film, a silicon oxynitride film, a silicon nitride film, a silicon nitride oxide film, and/or a film containing an organic material such as an organic resin by a plasma CVD method or a sputtering method. In this embodiment, a silicon oxide film with a thickness of 100 nm is formed by a plasma CVD method.

Then, the gate insulating film 708 and the insulating film are partially etched by anisotropic etching mainly in a perpendicular direction. The insulating film 708 is partially etched by the above-described anisotropic etching, so that a gate insulating film 713 which is partially formed over each of the island-shaped semiconductor films 705 to 707 is formed. In addition, the insulating film is partially etched by the above-described anisotropic etching, so that sidewalls 714 which are in contact with side surfaces of the electrode 709 are formed. The sidewalls 714 are used as doping masks when forming LDD (lightly doped drain) regions. In this embodiment, a mixed gas of $CHF_3$ and He is used as an etching gas. Note that the step of forming the sidewalls 714 is not limited thereto.

Next, a mask is formed so as to cover the island-shaped semiconductor film 707 which becomes the p-channel TFT. Then, doping of an impurity element imparting n-type conductivity (typically, P or As) at a high concentration with the electrode 709 and the sidewalls 714 used as masks in addition to the formed mask is performed (a third doping step). The third doping step is performed under the following conditions: a dose of $1\times10^{19}$ to $1\times10^{20}/cm^3$ and an acceleration voltage of 60 to 100 keV. In this third doping step, n-type high concentration impurity regions 715 are formed in the island-shaped semiconductor films 705 and 706.

Note that the sidewalls 714 serve as masks when an impurity imparting n-type conductivity is added at a high concentration in a step to form a low concentration impurity region or a non-doped offset region under the sidewalls 714. Thus, in order to control the width of the low concentration impurity region or the offset region, the size of the sidewalls 714 is adjusted in such a manner that conditions of anisotropic etching when forming the sidewalls 714 or the thickness of the insulating film for forming the sidewalls 714 are changed as appropriate. Note that a low concentration impurity region or a non-doped offset region may be formed under the sidewalls 714 in a p-channel TFT 718.

Next, activation of the impurity region by heat treatment may be performed after the mask is removed by ashing or the like. For example, after a silicon oxynitride film with a thickness of 50 nm is formed, heat treatment may be performed at 550° C. for 4 hours in a nitrogen atmosphere.

In addition, after a silicon nitride film containing hydrogen is formed to have a thickness of 100 nm, a step of hydrogenating the island-shaped semiconductor films 705 to 707 may be performed by heat treatment at 410° C. for 1 hour in a nitrogen atmosphere. Alternatively, the step of hydrogenating the island-shaped semiconductor films 705 to 707 may be performed by heat treatment at 300 to 450° C. for 1 to 12 hours in an atmosphere containing hydrogen. Thermal annealing, a laser annealing, RTA, or the like can be used for the heat treatment. By the heat treatment, not only hydrogenation but also activation of the impurity element added to the semiconductor films can be performed. As another means for the hydrogenation, plasma hydrogenation (which uses hydrogen excited by plasma) may be performed. In this hydrogenation step, a dangling bond can be terminated with the use of thermally excited hydrogen.

Through a series of the above-described steps, n-channel TFTs 716 and 717 and the p-channel TFT 718 are formed.

Next, as shown in FIG. 17C, an insulating film 720 which functions as a passivation film for protecting the TFTs 716 to 718 is formed. Although the insulating film 720 is not necessarily provided, an impurity such as an alkali metal or an alkaline earth metal can be prevented from entering the TFTs 716 to 718 when the insulating film 720 is formed. Specifically, it is desirable to use silicon nitride, silicon nitride oxide, aluminum nitride, aluminum oxide, silicon oxide, silicon oxynitride, or the like for the insulating film 720. In this embodiment, a silicon oxynitride film with a thickness of about 600 nm is used as the insulating film 720. In this case, the above-described hydrogenation step may be performed after formation of the silicon oxynitride film.

Next, an insulating film 721 is formed over the insulating film 720 so as to cover the TFTs 716 to 718. For the insulating film 721, an organic material with heat resistance, such as polyimide, acrylic, benzocyclobutene, polyamide, or epoxy can be used. Alternatively, a low-dielectric constant material (low-k material), a siloxane-based resin, silicon oxide, silicon nitride, silicon oxynitride, silicon nitride oxide, PSG (phosphosilicate glass), BPSG (borophosphosilicate glass), alumina, or the like can be used besides the above-described organic material. A siloxane-based resin may contain at least one of fluorine, an alkyl group, or aromatic hydrocarbon besides hydrogen as a substituent. Note that the insulating film 721 may be formed in such a manner that a plurality of insulating films formed of any of the above-described materials are stacked.

The insulating film 721 can be formed by a CVD method, a sputtering method, an SOG method, spin coating, dipping, spray coating, a droplet discharge method (an ink-jet method, screen printing, offset printing, or the like), a doctor knife, a roll coater, a curtain coater, a knife coater, or the like, depending on a material of the insulating film 721.

Next, contact holes are formed in the insulating film 720 and the insulating film 721 so that each of the island-shaped semiconductor films 705 and 707 is partially exposed. Then, a conductive film 722 and conductive films 723 to 728 which are in contact with the island-shaped semiconductor films 705 and 707 through the contact holes are formed. Although a mixed gas of $CHF_3$ and He is employed as an etching gas for forming the contact holes, the etching gas is not limited to the mixed gas of $CHF_3$ and He.

The conductive films 722 to 728 can be formed by a CVD method, a sputtering method, or the like. Specifically, for the conductive films 722 to 728, the following can be used: aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), silicon (Si), or the like; an alloy containing any of the above-described metals as a main component; or a compound containing any of the above-described metals. Each of the conductive films 722 to 728 can be formed as a single layer of a film which uses any of the above-described metals or a stacked layer of a plurality of the films.

As examples of an alloy containing aluminum as its main component, an alloy containing aluminum as a main component and also containing nickel, and an alloy containing aluminum as a main component and also containing nickel and one or both of carbon and silicon are given. Aluminum and aluminum silicon are optimal for a material for forming the conductive films 722 to 728 because they have low resistance values and are inexpensive. In particular, an aluminum silicon film can prevent generation of a hillock in resist baking when the conductive films 722 to 728 are patterned, in comparison with an aluminum film. Instead of silicon (Si), Cu may be mixed into an aluminum film at about 0.5%.

For the conductive films 722 to 728, for example, a stacked-layer structure of a barrier film, an aluminum silicon film, and a barrier film or a stacked-layer structure of a barrier film, an aluminum silicon film, a titanium nitride film, and a barrier film is preferably employed. Note that a barrier film is a film formed using titanium, a nitride of titanium, molybdenum, or a nitride of molybdenum. When barrier films are formed so as to interpose an aluminum silicon film, generation of a hillock of aluminum or aluminum silicon can be further prevented. In addition, when a barrier film is formed using titanium that is a highly-reducible element, even if a thin oxide film is formed over the island-shaped semiconductor films 705 to 707, the oxide film is reduced by titanium contained in the barrier film, so that preferable contact between the conductive films 723 to 728 and the island-shaped semiconductor films 705 to 707 can be obtained. Alternatively, a plurality of barrier films may be stacked to be used. In this case, for example, each of the conductive films 722 to 728 can be formed to have a five-layer structure in which titanium, titanium nitride, aluminum silicon, titanium, and titanium nitride are stacked in this order from a lower layer side.

Note that the conductive films 723 and 724 are connected to the high concentration impurity regions 715 of the n-channel TFT 716. The conductive films 725 and 726 are connected to the high concentration impurity regions 715 of the n-channel TFT 717. The conductive films 727 and 728 are connected to the high concentration impurity regions 712 of the p-channel TFT 718.

Figure 18A:
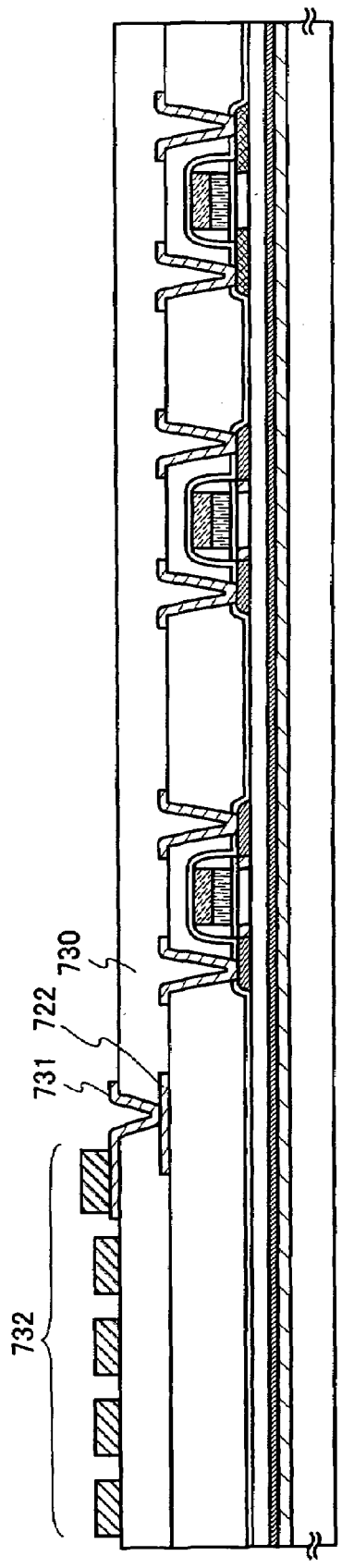
FIGS. 18A and 18B are views showing a manufacturing method of a charging device of the present invention.

Next, as shown in FIG. 18A, an insulating film 730 is formed so as to cover the conductive films 722 to 728, and then a contact hole is formed in the insulating film 730 so that part of the conductive film 722 is exposed. Then, a conductive film 731 is formed so as to be in contact with the conductive film 722 in the contact hole. Any material can be used as a material of the conductive film 731 as long as it is a material which can be used for the conductive films 722 to 728.

The insulating film 730 can be formed using an organic resin film, an inorganic insulating film, or a siloxane-based insulating film. For an organic resin film, for example, acrylic, epoxy, polyimide, polyamide, polyvinylphenol, benzocyclobutene, or the like can be used. As an inorganic insulating film, for example, a film containing silicon oxide, silicon oxynitride, silicon nitride oxide, or carbon typified by DLC (diamond like carbon), or the like can be used. Note that a mask used for forming an opening by photolithography can be formed by a droplet discharge method or a printing method. In addition, the insulating film 730 can be formed by a CVD method, a sputtering method, a droplet discharge method, a printing method, or the like, depending on a material of the insulating film 730.

Next, a conductive film 732 functioning as an antenna is formed so that part of the conductive film 732 is in contact with the conductive film 731. The conductive film 732 can be formed using a metal such as silver (Ag), gold (Au), copper (Cu), palladium (Pd), chromium (Cr), platinum (Pt), molybdenum (Mo), titanium (Ti), tantalum (Ta), tungsten (W), aluminum (Al), iron (Fe), cobalt (Co), zinc (Zn), tin (Sn), or nickel (Ni). Alternatively, as the conductive film 732, a film formed of an alloy containing any of the above-described metals as a main component or a film formed of a compound containing any of the above-described metals may be used instead of a film formed of any of the above-described metals. The conductive film 732 may be formed as a single layer of the above-described film or a stacked layer of a plurality of above-described films.

The conductive film 732 can be formed by a CVD method, a sputtering method, a printing method such as screen printing or gravure printing, a droplet discharge method, a dispenser method, a plating method, photolithography, an evaporation method, or the like.

For example, in a case of using screen printing, the conductive film 732 can be formed in such a manner that a conductive paste in which particles (conductive particles) each having a grain size of several nm to several tens of µm are dispersed in an organic resin is printed selectively over the insulating film 730. The conductive particle can be formed using silver (Ag), gold (Au), copper (Cu), nickel (Ni), platinum (Pt), palladium (Pd), tantalum (Ta), molybdenum (Mo), tin (Sn), lead (Pb), zinc (Zn), chromium (Cr), titanium (Ti), or the like. Alternatively, the conductive particle can be formed of an alloy containing any of the above-described metals as a main component or a compound containing any of the above-described metals instead of a film formed of any of the above-described metals. Alternatively, a fine particle or a dispersive nanoparticle of silver halide can also be used. As an organic resin contained in the conductive paste, polyimide, a siloxane-based resin, an epoxy resin, a silicone resin, or the like can be used.

As examples of an alloy of any of the above-described metals, combinations of silver (Ag) and palladium (Pd), silver (Ag) and platinum (Pt), gold (Au) and platinum (Pt), gold (Au) and palladium (Pd), and silver (Ag) and copper (Cu) are given. Alternatively, for example, a conductive particle in which copper (Cu) is coated with silver (Ag), or the like can be used.

When forming the conductive film 732, baking is preferably performed after the conductive paste is applied by a printing method or a droplet discharge method. For example, in a case where conductive particles (e.g., grain size of greater than or equal to 1 nm and less than or equal to 100 nm) containing silver as a main component are used for the conductive paste, the conductive paste is baked at temperatures ranging from 150 to 300° C., and thus the conductive film 732 can be formed. Baking may be performed by lamp annealing which uses an infrared lamp, a xenon lamp, a halogen lamp, or the like; furnace annealing which uses an electric furnace; or a laser annealing method which uses an excimer laser or an Nd:YAG laser. Alternatively, fine particles containing solder or lead-free solder as a main component may be used. In this case, it is preferable to use fine particles which have a grain size of less than or equal to 20 µm. Solder and lead-free solder have an advantage such as low cost.

When a printing method or a droplet discharge method is used, the conductive film 732 can be formed without using a mask for light-exposure. In addition, when a droplet discharge method or a printing method is used, waste of a material which would be removed by etching can be avoided unlike in a case of photolithography. In addition, since an expensive mask for light exposure does not have to be used, the cost for manufacturing a semiconductor device can be reduced.

Figure 18B:
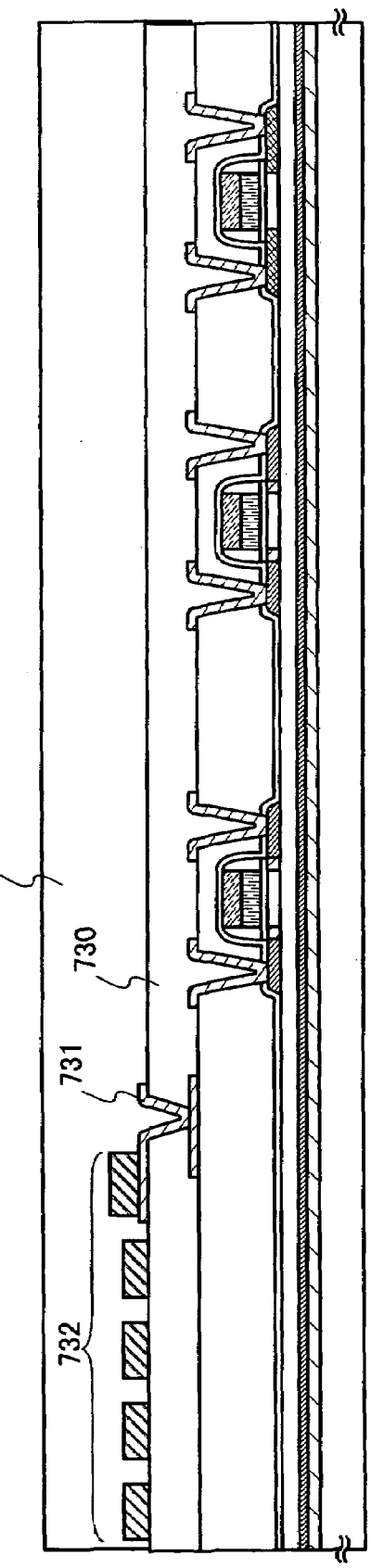

Next, as shown in FIG. 18B, an insulating film 733 is formed over the insulating film 730 so as to cover the conductive films 731 and 732. The insulating film 733 can be formed using an organic resin film, an inorganic insulating film, or a siloxane-based insulating film. For an organic resin film, for example, acrylic, epoxy, polyimide, polyamide, polyvinylphenol, benzocyclobutene, or the like can be used. As an inorganic insulating film, a film containing silicon oxide, silicon oxynitride, silicon nitride oxide, or carbon typified by DLC (diamond like carbon), or the like can be used. Note that a mask used for forming an opening by photolithography can be formed by a droplet discharge method or a printing method. In addition, the insulating film 733 can be formed by a CVD method, a sputtering method, a droplet discharge method, a printing method, or the like, depending on a material of the insulating film 733. Note that the insulating film 733 is not necessarily formed.

Next, as shown in FIG. 19A, a layer including semiconductor elements typified by TFTs, which are the insulating films 703 to 733, and various conductive films (hereinafter referred to as an "element formation layer 734") is peeled off from the substrate 700. In this embodiment, a first sheet material 735 is attached to a surface on the insulating film 733 side of the element formation layer 734, and then the element formation layer 734 is peeled off from the substrate 700 by physical force. The peeling layer 702 may be partially left without being completely removed.

The above-described peeling may be performed by a method using etching of the peeling layer 702. In this case, a groove is formed so that part of the peeling layer 702 is exposed. The groove is formed by dicing, scribing, processing using laser light including UV light, photolithography, or the like. The groove has only to be deep enough to expose the peeling layer 702. In addition, halogen fluoride is used as an etching gas, which is introduced from the groove. In this embodiment, for example, $ClF_3$ (chlorine trifluoride) is used under the following conditions: a temperature of 350° C., a flow rate of 300 sccm, a pressure of 6 Torr, and processing time of 3 hours. Alternatively, a mixed gas of nitrogen and $ClF_3$ may also be used. The peeling layer 702 is selectively etched with the use of halogen fluoride such as $ClF_3$, so that the substrate 700 can be peeled off from the TFTs 716 to 718. Note that halogen fluoride may be either gas or liquid.

Next, as shown in FIG. 19B, after a second sheet material 736 is attached to a surface exposed by the above-described peeling of the element formation layer 734, the element formation layer 734 is peeled off from the first sheet material 735.

Note that in a case where semiconductor elements corresponding to a plurality of semiconductor devices are formed over the substrate 700, the element formation layer 734 is divided for each semiconductor device. A laser irradiation apparatus, a dicing apparatus, a scribing apparatus, or the like can be used for division.

Note that, although an example in which an antenna and a semiconductor element are formed over the same substrate is described in this embodiment, the present invention is not limited to this structure. After formation of the semiconductor element, an antenna which is separately formed may be electrically connected to an integrated circuit. In this case, the antenna and the integrated circuit can be electrically connected to each other after being pressure-bonded with an anisotropic conductive film (ACF), anisotropic conductive paste (ACP), or the like. Alternatively, a conductive adhesive such as a silver paste, a copper paste, or a carbon paste; solder joint; or the like can be used for the connection.

After the semiconductor device shown in FIG. 19B is completed, a third sheet material may be attached so as to cover the insulating film 733, and the second sheet material 736 and the third sheet material may be attached to each other by one or both heat treatment and pressure treatment. A hot melt film or the like may be used for the second sheet material 736 and the third sheet material. Alternatively, even in a case where the third material is not prepared, the first sheet material 735 and the second sheet material 736 may be attached to each other without peeling off the first sheet material 735.

As the second sheet material 736 and the third sheet material, a film to which antistatic treatment for preventing static electricity or the like is performed (hereinafter referred to as an antistatic film) can also be used. Sealing is performed using the antistatic film, so that a semiconductor element can be prevented from being adversely affected due to external static electricity or the like when dealt with as a product.

For the antistatic film, a type in which a material capable of preventing static charge (antistatic agent) is mixed into a film, a type in which a film itself has an antistatic effect, a type in which a film is coated with an antistatic agent, and the like are given. For the antistatic agent, nonionic polymers, anionic polymers, cationic polymers, nonionic surfactants, anionic surfactants, cationic surfactants, or amphoteric surfactants can be used. Alternatively, a metal, indium tin oxide (ITO), or the like can be used as the antistatic agent. In addition, for a material of the film which has an antistatic effect, an olefin-based resin, an ABS resin, a styrene-based resin, a PMMA resin, a polycarbonate-based resin, a PVC polyester-based resin, a polyamide resin, a modified PPO resin, or the like can be used.

Note that, although a case of forming a coiled antenna for the conductive film 732 is given as an example in this embodiment, this embodiment is not limited to this structure. In the present invention, the shape of the antenna is not limited to the coil shape, and a dipole antenna or a patch antenna may also be used. The antenna used in this embodiment is acceptable as long as it is an antenna which has a function of receiving radio waves and can be formed by photolithography.

In addition, although an example in which the element formation layer 734 is used after being peeled off from the substrate 700 is shown in this embodiment, the element formation layer 734 may be formed over the substrate 700 and used as various circuits of a charging circuit, without providing the peeling layer 702.

This embodiment can be implemented in combination with any of the above-described embodiment modes or the above-described embodiments as appropriate.

Embodiment 4

In this embodiment, an example of manufacturing a charging device of the present invention with the use of a transistor formed using a single crystalline substrate will be described. The transistor formed using a single crystalline substrate can suppress variation in characteristics; thus, the number of transistors used for the charging device can be reduced.

First, as shown in FIG. 20A, an element isolation insulating film 2301 for electrically isolating a semiconductor element is formed of an insulating film on a semiconductor substrate 2300. Formation of the element isolation insulating film 2301 makes it possible to electrically isolate a region for forming a transistor (element formation region) 2302 from an element formation region 2303.

As the semiconductor substrate 2300, a single crystalline silicon substrate having n-type or p-type conductivity or a compound semiconductor substrate (a GaAs substrate, an InP substrate, a GaN substrate, a SiC substrate, a sapphire substrate, a ZnSe substrate, or the like), an SOI (silicon on insulator) substrate formed by a bonding method or a SIMOX (separation by implanted oxygen), or the like can be used.

For formation of the element isolation insulating film 2301, a selective oxidation method (LOCOS (local oxidation of silicon) method), a trench isolation method, or the like can be used.

Note that, in this embodiment, an example in which a single crystalline silicon substrate having n-type conductivity is used as the semiconductor substrate 2300 and a p-well 2304 is formed in the element formation region 2303 is shown. An impurity element imparting p-type conductivity is selectively introduced into the element formation region 2303, so that the p-well 2304 formed in the element formation region 2303 of the semiconductor substrate 2300 can be formed. As the impurity element imparting p-type conductivity, boron (B), aluminum (Al), gallium (Ga), or the like can be used. On the other hand, in a case where a semiconductor substrate having p-type conductivity is used as the semiconductor substrate 2300, an n-well may be formed in such a manner that an impurity element imparting n-type conductivity is selectively introduced into the element formation region 2302.

Note that an impurity element is not introduced into the element formation region 2302 because the semiconductor substrate having n-type conductivity is used as the semiconductor substrate 2300 in this embodiment. However, an n-well may be formed in the element formation region 2302 by introduction of an impurity element imparting n-type conductivity. As the impurity element imparting n-type conductivity, phosphorus (P), arsenic (As), or the like can be used.

Next, as shown in FIG. 20B, insulating films 2305 and 2306 are formed so as to cover the element formation regions 2302 and 2303, respectively. In this embodiment, silicon oxide films which are formed in the element formation regions 2302 and 2303 by thermal oxidization of the semiconductor substrate 2300 are used as the insulating films 2305 and 2306. Alternatively, as each of the insulating films 2305 and 2306, a stacked layer of a silicon oxide film and a silicon oxynitride film may be used which is formed in such a manner that the silicon oxide film is formed by thermal oxidation and then a surface of the silicon oxide film is nitrided by nitridation treatment to form the silicon oxynitride film.

Further alternatively, the insulating films 2305 and 2306 may be formed by plasma treatment as described above. For example, by oxidation or nitridation of a surface of the semiconductor substrate 2300 by high-density plasma treatment, a silicon oxide ($SiO_x$) films or a silicon nitride ($SiN_x$) film to be used as the insulating films 2305 and 2306 can be formed in the element formation regions 2302 and 2303.

Next, as shown in FIG. 20C, a conductive film is formed so as to cover the insulating films 2305 and 2306. In this embodiment, an example is shown in which a conductive film 2307 and a conductive film 2308 are sequentially stacked as the conductive film. The conductive film may be a single layer of a conductive film or a staked layer in which three or more conductive films are stacked.

The conductive film 2307 and the conductive film 2308 can be formed of tantalum (Ta), tungsten (W), titanium (Ti), molybdenum (Mo), aluminum (Al), copper (Cu), chromium (Cr), niobium (Nb), or the like, a film formed of an alloy containing any of the above-described metals as a main component, or a film formed of a compound containing any of the above-described metals. Alternatively, a semiconductor material typified by polycrystalline silicon which is formed in such a manner that a semiconductor film is doped with an impurity element imparting conductivity, such as phosphorus, may be used. In this embodiment, the conductive film 2307 is formed using tantalum nitride, and the conductive film 2308 is formed using tungsten.

Figure 21A:
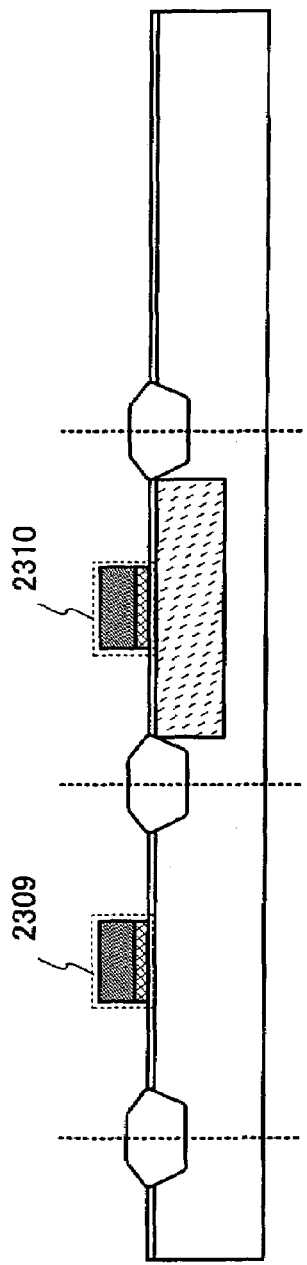
FIGS. 21A to 21C are views showing a manufacturing method of a charging device of the present invention.

Next, as shown in FIG. 21A, the stacked conductive films 2307 and 2308 are processed (patterned) into a predetermined shape, so that a gate electrode 2309 and a gate electrode 2310 are formed over the insulating films 2305 and 2306, respectively.

Figure 21B:
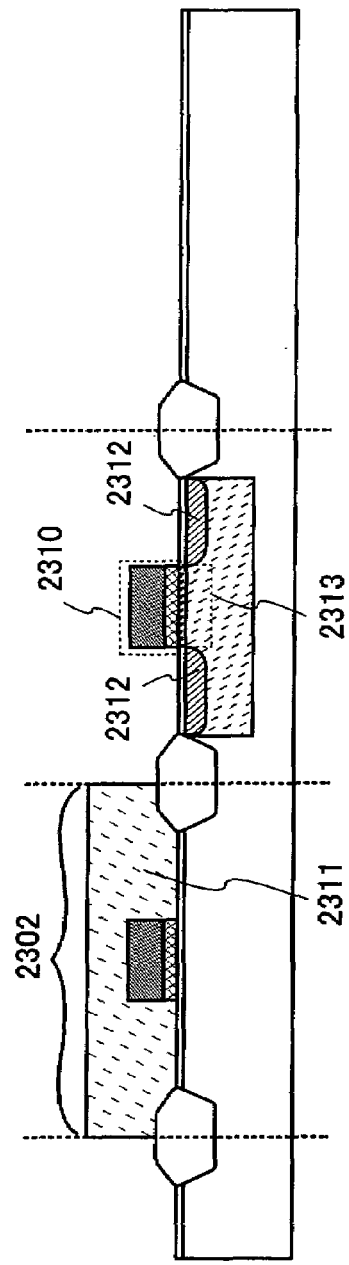

Next, as shown in FIG. 21B, a mask 2311 is selectively formed using a resist so as to cover the element formation region 2302, and an impurity element is introduced into the element formation region 2303. Since the gate electrode 2310 as well as the mask 2311 function as masks, by introduction of the impurity element, impurity regions 2312 one of which functions as a source region and the other as a drain region and a channel formation region 2313 are formed in the p-well 2304. As the impurity element, an impurity element imparting n-type conductivity or an impurity element imparting p-type conductivity is used. As the impurity element imparting n-type conductivity, phosphorus (P), arsenic (As), or the like can be used. As the impurity element imparting p-type conductivity, boron (B), aluminum (Al), gallium (Ga), or the like can be used. In this embodiment, phosphorus (P) is used as the impurity element.

Figure 21C:
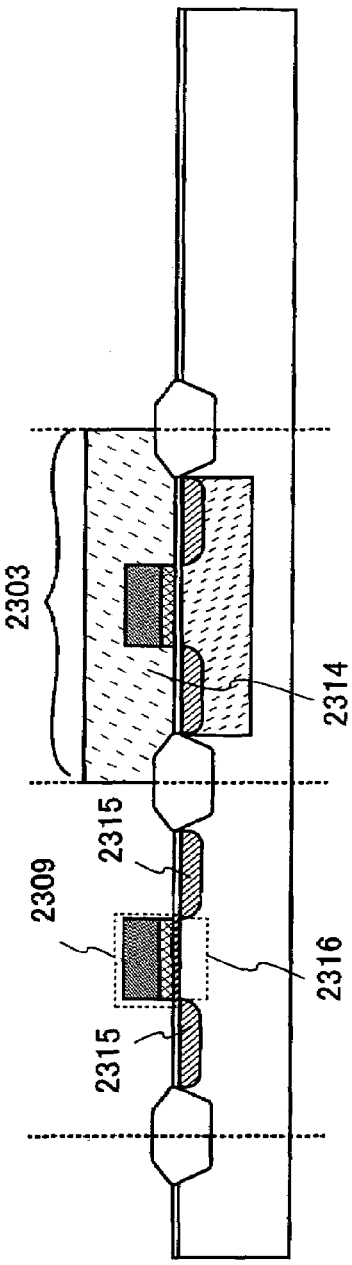

After the mask 2311 is removed, a mask 2314 is selectively formed as selected using a resist so as to cover the element formation region 2303 as shown in FIG. 21C. Then, an impurity element is introduced into the element formation region 2302. Since the gate electrode 2309 as well as the mask 2314 function as masks, by introduction of the impurity element, impurity regions 2315 one of which functions as a source region and the other as a drain region and a channel formation region 2316 are formed in the semiconductor substrate 2300 in the element formation region 2302. As the impurity element, an impurity element imparting n-type conductivity or an impurity element imparting p-type conductivity is used. As the impurity element imparting n-type conductivity, phosphorus (P), arsenic (As), or the like can be used. As the impurity element imparting p-type conductivity, boron (B), aluminum (Al), gallium (Ga), or the like can be used. In this embodiment, an impurity element imparting conductivity which is different from that of the impurity element introduced into the element formation region 2303 in FIG. 21B (e.g, boron (B)) is introduced.

Next, as shown in FIG. 22A, an insulating film 2317 is formed so as to cover the insulating films 2305 and 2306 and the gate electrodes 2309 and 2310, and then contact holes are formed in the insulating film 2317, so that part of the impurity regions 2312 and 2315 are exposed. Then, conductive films 2318 connected to the impurity regions 2312 and 2315 through the contact holes are formed. The conductive films 2318 can be formed by a CVD method, a sputtering method, or the like.

The insulating film 2317 can be formed using an inorganic insulating film, an organic resin film, or a siloxane-based insulating film. As an inorganic insulating film, a film containing silicon oxide, silicon oxynitride, silicon nitride oxide, or carbon typified by DLC (diamond like carbon), or the like can be used. For an organic resin film, for example, acrylic, epoxy, polyimide, polyamide, polyvinylphenol, benzocyclobutene, or the like can be used. In addition, the insulating film 2317 can be formed by a CVD method, a sputtering method, a droplet discharge method, a printing method, or the like, depending on a material of the insulating film 2317.

Note that a transistor used for the semiconductor device of the present invention is not limited to the structure illustrated in this embodiment. For example, an inversely-staggered structure may be employed.

Next, as shown in FIG. 22B, an interlayer film 2324 is formed. Then, the interlayer film 2324 is etched to form a contact hole, so that part of the conductive film 2318 is exposed. The interlayer film 2324 is not limited to a resin, and may be any other film such as a CVD oxidation film; however, the interlayer film 2324 is desirably a resin in terms of flatness. Alternatively, a contact hole may be formed using a photosensitive resin without using etching. After that, a wiring 2325 which is in contact with the conductive film 2318 through the contact hole is formed over the interlayer film 2324.

Next, a conductive film 2326 functioning as an antenna is formed so as to be in contact with the wiring 2325. The conductive film 2326 can be formed using a metal such as silver (Ag), gold (Au), copper (Cu), palladium (Pd), chromium (Cr), platinum (Pt), molybdenum (Mo), titanium (Ti), tantalum (Ta), tungsten (W), aluminum (Al), iron (Fe), cobalt (Co), zinc (Zn), tin (Sn), or nickel (Ni). Alternatively, as the conductive film 2326, a film formed of an alloy containing any of the above-described metals as a main component or a film formed of a compound containing any of the above-described metals may be used instead of a film formed of any of the above-described metals. The conductive film 2326 can be formed of a single layer of the above-described film or a stacked layer of a plurality of above-described films.

The conductive film 2326 can be formed by a CVD method, a sputtering method, a printing method such as screen printing or gravure printing, a droplet discharge method, a dispenser method, a plating method, photolithography, an evaporation method, or the like.

Note that, although the example in which the antenna and the semiconductor element are formed over the same substrate is described in this embodiment, the present invention is not limited to this structure. After formation of the semiconductor element, an antenna which is separately formed may be electrically connected to various circuits. In this case, the antenna and the various circuits can be electrically connected to each other after being pressure-bonded with an anisotropic conductive film (ACF), an anisotropic conductive paste (ACP), or the like. Alternatively, a conductive adhesive such as a silver paste, a copper paste, or a carbon paste; solder joint; or the like can be used for the connection.

Note that this embodiment can be implemented in combination with any of the above-described embodiment modes or the above-described embodiments as appropriate.

This application is based on Japanese Patent Application serial no. 2007-010014 filed with Japan Patent Office on Jan. 19, 2007, the entire contents of which are hereby incorporated by reference.

What is claimed is:

1. A charging device comprising:
a first antenna circuit for receiving a first radio wave;
a rectifier circuit for rectifying first AC voltage generated in the first antenna circuit to generate DC voltage;
a power supply circuit for adjusting a magnitude of the DC voltage;
an oscillation circuit for generating second AC voltage when the adjusted DC voltage is inputted to the oscillation circuit;
an oscillation control circuit for controlling the oscillation circuit;
a second antenna circuit for generating a second radio wave when the second AC voltage is supplied to the second antenna circuit;
a first protective material covering the rectifier circuit, the power supply circuit, the oscillation circuit, the oscillation control circuit, and the second antenna circuit; and
a second protective material covering the first antenna circuit.

2. The charging device according to claim 1, wherein the second protective material is further covering the rectifier circuit, the power supply circuit, the oscillation circuit, the oscillation control circuit, and the second antenna circuit.

3. The charging device according to claim 1, wherein a frequency of the second radio wave is lower than a frequency of the first radio wave.

4. The charging device according to claim 1, wherein the first protective material is a material in which a carbon material, a ferrite material, or a carbonyl iron material is mixed into a synthetic rubber or urethane.

5. The charging device according to claim 1, wherein the second protective material is either one of a synthetic resin or ceramic.

6. The charging device according to claim 1, wherein the first protective material is thicker than the second protective material.

7. A charging device comprising:
a first antenna circuit for receiving a first electric power;
a rectifier circuit for rectifying first AC voltage generated in the first antenna circuit to generate DC voltage;
a power supply circuit for adjusting a magnitude of the DC voltage;
an oscillation circuit for generating second AC voltage when the adjusted DC voltage is inputted to the oscillation circuit;
an oscillation control circuit for controlling the oscillation circuit;
a second antenna circuit for generating a second electric power when the second AC voltage is supplied to the second antenna circuit;
a first protective material covering the rectifier circuit, the power supply circuit, the oscillation circuit, the oscillation control circuit, and the second antenna circuit; and
a second protective material covering the first antenna circuit.

8. The charging device according to claim 7, wherein the first electric power is a first radio wave and the second electric power is a second radio wave.

9. The charging device according to claim 7, wherein the second protective material is further covering the rectifier circuit, the power supply circuit, the oscillation circuit, the oscillation control circuit, and the second antenna circuit.

10. The charging device according to claim 8, wherein a frequency of the second radio wave is lower than a frequency of the first radio wave.

11. The charging device according to claim 7, wherein the first protective material is a material in which a carbon material, a ferrite material, or a carbonyl iron material is mixed into a synthetic rubber or urethane.

12. The charging device according to claim 7, wherein the second protective material is either one of a synthetic resin or ceramic.

13. The charging device according to claim 7, wherein the first protective material is thicker than the second protective material.

14. A charging device comprising:
a first antenna circuit for receiving a first electric power;
a rectifier circuit for rectifying first AC voltage generated in the first antenna circuit to generate DC voltage;
a power supply circuit for adjusting a magnitude of the DC voltage;
an oscillation circuit for generating second AC voltage when the adjusted DC voltage is inputted to the oscillation circuit;
an oscillation control circuit for controlling the oscillation circuit; and
a second antenna circuit for generating a second electric power when the second AC voltage is supplied to the second antenna circuit.

15. The charging device according to claim 14, wherein the first electric power is a first radio wave and the second electric power is a second radio wave.

16. The charging device according to claim 15, wherein a frequency of the second radio wave is lower than a frequency of the first radio wave.

* * * * *